(12) United States Patent
Matsui et al.

(10) Patent No.: US 9,304,293 B2
(45) Date of Patent: Apr. 5, 2016

(54) IMAGING LENS, IMAGING APPARATUS AND MOBILE TERMINAL DEVICE

(75) Inventors: Kazuki Matsui, Higashiyamato (JP); Takashi Kawasaki, Koganei (JP)

(73) Assignee: Konica Minolta, Inc., Tokyo (JP)

( * ) Notice: Subject to any disclaimer, the term of this patent is extended or adjusted under 35 U.S.C. 154(b) by 119 days.

(21) Appl. No.: 14/119,140

(22) PCT Filed: May 10, 2012

(86) PCT No.: PCT/JP2012/061963
§ 371 (c)(1),
(2), (4) Date: Nov. 20, 2013

(87) PCT Pub. No.: WO2012/160983
PCT Pub. Date: Nov. 29, 2012

(65) Prior Publication Data
US 2014/0192424 A1    Jul. 10, 2014

(30) Foreign Application Priority Data
May 20, 2011   (JP) .................. 2011-113285

(51) Int. Cl.
| G02B 9/04 | (2006.01) |
| G02B 3/02 | (2006.01) |
| G02B 9/00 | (2006.01) |
| G02B 13/00 | (2006.01) |

(52) U.S. Cl.
CPC ............ *G02B 13/003* (2013.01); *G02B 13/006* (2013.01); *G02B 13/0085* (2013.01)

(58) Field of Classification Search
USPC ................................. 359/717, 793, 796, 797
See application file for complete search history.

(56) References Cited

U.S. PATENT DOCUMENTS 7,457,053 B2    11/2008   Oh et al.

FOREIGN PATENT DOCUMENTS

| JP | 3929479 | 6/2007 |
| JP | 2009-251210 | 10/2009 |
| JP | 2010-54810 | 3/2010 |
| JP | 2010-92022 | 4/2010 |
| JP | 2010-117387 | 5/2010 |
| JP | 2011-22494 | 2/2011 |
| WO | WO 2008/102648 | 8/2008 |
| WO | WO 2010/143458 | 12/2010 |

*Primary Examiner* — Jack Dinh
(74) *Attorney, Agent, or Firm* — Cozen O'Connor

(57) ABSTRACT

Imaging lens comprises, in order from the object side, a first lens block having a convex and concave surfaces oriented toward the object and image side respectively, and having a positive power, and a second lens. An aperture stop can be located on the object side of the first lens block, a peripheral portion of the image side surface of the second lens has a positive power where: $0.62<\text{fla}/f<0.82$ (1) $-4.00<\text{flb}/f<-1.11$ (2) $0.70<D4/f<1.00$ (3) with, fla: focal distance of object side lens portion of the first lens block; flb: focal distance of an image side lens portion of the first lens block; D4: distance on the optical axis from the object side surface of the first lens block to the image side surface of the second lens; f: focal distance of the imaging lens total system.

13 Claims, 11 Drawing Sheets

【EXAMPLE 3】

【EXAMPLE 4】

【EXAMPLE 5】

【EXAMPLE 6】

【EXAMPLE 7】

IMAGING LENS, IMAGING APPARATUS AND MOBILE TERMINAL DEVICE

RELATED APPLICATIONS

This application is a U.S. National Phase Application under 35 USC 371 of International Application PCT/JP2012/061963 filed May 10, 2012.

This application claims the priority of Japanese application No. 2011-113285 filed May 20, 2011, the entire content of which is hereby incorporated by reference.

TECHNICAL FIELD

The present invention relates to an imaging lens of an imaging device which uses solid state imaging elements, such as CCD (Charge Coupled Devices) type image sensors and CMOS (Complementary Metal-oxide Semiconductor) type image sensors. In more detail, the present invention relates to an imaging lens in an optical system employing a wafer scale lens suitable for mass production and to a mobile terminal device employing the imaging lens.

BACKGROUND ART

Imaging apparatuses of a compact thin type have become so as to be installed in mobile terminal devices which are electronic devices of a compact thin type, such as a mobile telephone and a PDA (Personal Digital Assistance). With this, it has become possible to transmit mutually not only voice information, but also image information to distant places.

As image sensors used for these imaging devices, solid state imaging elements, such as CCD type image sensors and CMOS type image sensors, have been used. In recent years, a trend to make the density of pixels of an imaging element higher has been advanced, and making each of an image resolution and a performance higher has been attempted. Further, as a lens to form an image of a photographic object on these imaging elements, a lens made of resin suitable for mass production has been used in order to lower the cost more. Furthermore, since the lens made of resin has a good workability, it has responded to a request for higher performance by being shaped in an aspheric surface configuration.

As such an imaging lens used for an imaging apparatus incorporated in a mobile terminal device, a type with a three plastic lens structure and an optical system with a three lens structure composed of a single glass lens and two plastic lenses have been generally well known. However, in a situation that a request for these imaging lenses to be made more compact and a request for mobile terminal devices to be produced in a mass production process become severer, it becomes more difficult to respond to both of the requests simultaneously.

In order to overcome these problems, a technique to produce lens modules in the following mass production process has been proposed. Lens elements are mass produced simultaneously on a several inch glass base plate being a parallel flat plate by a replica method, the glass base plate (lens wafer) on which the large number of these lens elements are formed is combined with a sensor wafer, and then the lens elements are separated from each other into respective lens modules. The lenses produced in the above mass production process are called wafer scale lenses, and the lens modules are called wafer scale lens modules.

Further, in addition to the technique to produce lens modules in the mass production process, as a method of mounting the large numbers of lens modules on a base plate at low cost, in recent years, the following method has been proposed. That is, together with IC (Integrated Circuit) chips and other electronic components, lens modules are placed on a base plate on which solder has been coated previously by potting, and then the lens modules are subjected to a reflow process (heating process) while being placed on the base plate. Accordingly, by melting the solder, the lens modules and the electronic components are mounted simultaneously on the base plate. Therefore, the imaging lenses are requested to be excellent in heat resistance so as to be durable for the reflow process.

CITATION LIST

Patent Literature

As such an imaging lens, a lens block with a two lens constitution has been proposed by PTLs 1 to 3.
PTL 1: J.P. Patent No. 3929479
PTL 2: U.S. Pat. No. 7,457,053
PTL 3: JP 2011-22494 A

SUMMARY OF INVENTION

Technical Problem

Here, in the imaging lens shown in PTL 1, since each of the object side lens section and the image side lens section of the first lens block has a too strong power, an aberration correcting ability becomes insufficient. Accordingly, it may be difficult to say that the imaging lens is enabled to sufficiently respond to a higher pixel density of a solid state imaging element. Further, in the imaging lens shown in PTL 2, since the power of the object side lens section of the first lens block is weak, the shortening of the optical overall length is insufficient. Furthermore, in the imaging lens shown in PTL 3, since the power of the first lens block is too strong, the aberration correction becomes short. Alternatively, a distance on the optical axis from the object side surface of the first lens block to the image side surface of the second lens block is too long, the effective diameter of the image side surface of the second lens block becomes large. As a result, there is a problem that the XY size of the lens module is needed to be made large so as to match with the effective diameter.

The present invention has been achieved in view of the above situations. An object of the present invention is to provide an imaging apparatus which has a good aberration performance while being advantageous in the shortening of the optical overall length, can suppress an XY size to be small as a module by making the effective diameter of an optical surface small, and can be produced at low cost with a high performance by realizing an optical design of a wafer scale lens and enabling mass production, and to provide a mobile terminal device employing the imaging apparatus.

Solution to Problem

An imaging lens described in claim 1 is characterized in that an optical component including a lens base plate being a parallel flat plate and a lens section which is formed on at least one of an object side surface and an image side surface of the lens base plate and has a positive or negative power, is called a lens block;

the imaging lens includes a first lens block and a second lens sequentially from an object side, wherein the first lens block has a convex surface facing the object side and a concave surface facing the image side and has a positive power, an aperture stop is disposed at the object side of the first lens block or at the inside of the first lens block, a peripheral portion on the image side surface of the second lens has a positive power, and the following conditional expressions are satisfied, $$0.62 < f1a/f < 0.82 \quad (1)$$

$$-4.00 < f1b/f < -1.11 \quad (2)$$

$$0.70 < D4/f < 1.00 \quad (3)$$

where f1a represents the focal length of the object side lens section of the first lens block, f1b represents the focal length of the image side lens section of the first lens block, D4 represents a distance on the optical axis from the object side surface of the first lens block to the image side surface of the second lens, and f represents the focal length of the imaging lens whole system.

With a two-lens constitution in which the imaging lens is constituted by two lenses, the function of the imaging lens is made higher than a single lens constitution, and the total length of the imaging lens is made shorter than a three-lens constitution. Since a convex surface on the object side surface of the first lens block faces the object side, the position of a principal point can be located at the object side. Accordingly, the optical total length can be made smaller. Further, since an aperture stop is disposed at the object side of the first lens block or at the inside of the first lens block, the position of an exit pupil can be moved to the object side. Accordingly, the telecentric characteristic for the imaging element becomes good. Furthermore, since a peripheral portion on the image side surface of the second lens is made convex, peripheral light rays are refracted in the direction in which the entering angle of the peripheral light rays into the imaging element is made close to perpendicularity. Accordingly, it becomes possible to prevent the telecentric characteristic from becoming too bad.

Further, when the value of the conditional expression (1) is made lower than the upper limit, it becomes possible to attain the target optical overall length. On the other hand, when the value of the conditional expression (1) is made higher than the lower limit, it becomes possible to suppress the occurrence of high order aberration due to a too strong positive power. It is preferable to satisfy the following conditional expression.

$$0.66 < f1a/f < 0.77 \quad (1')$$

Furthermore, when the value of the conditional expression (2) is made higher than the lower limit, it becomes possible to prevent the occurrence of high order spherical aberration, coma aberration, and magnification chromatic aberration. Moreover, in the case where the radius of curvature of the image side surface of the first lens block is extremely small, when light rays having entered at an entering angle larger than the maximum image height are emitted from the image side surface of the first lens block, the emitted light rays are made to jump up largely, and then, is reflected again toward the image side surface of the first lens block, which causes concern about occurrence of ghost. However, when the value of the conditional expression (2) is made higher than the lower limit, it becomes possible to prevent the occurrence of ghost. On the other hand, when the value of the conditional expression (2) is made lower than the upper limit, a Petzval sum becomes small, so that it becomes possible to suppress image surface curvature to be small. It is preferable to satisfy the following conditional expression.

$$-3.50 < f1b/f < -1.13 \quad (2')$$

Further, when the value of the conditional expression (3) is made lower than the upper limit, the image side surface of the second lens block is made far away from an imaging surface, the entering height of peripheral light rays becomes low, and the effective radius becomes small. Accordingly, it becomes possible to suppress the size, in the direction perpendicular to the optical axis, of the imaging lens to be small. On the other hand, when the value of the conditional expression (3) is made higher than the lower limit, it becomes possible to prevent the insufficient correction of the image surface curvature due to the reason that the height of light rays entering the image side surface of the second lens block at the peripheral image height becomes too low. It is preferable to satisfy the following conditional expression.

$$0.75 < D4/f < 0.95 \quad (3')$$

The imaging lens described in claim 2 in the invention described in claim 1 is characterized in that the second lens is a lens block including a lens base plate being a parallel flat plate and a lens section which is formed on at least one of an object side surface and an image side surface of the lens base plate and has a positive or negative power.

Since the second lens is made a lens block, the second lens is provided with a lens base plate. Accordingly, it becomes possible to dispose a flare stop (light shielding stop) on the lens base plate so as to omit an additional light shielding member, and to apply an IR cutoff coat so as to omit another member having an IR cut function. Further, with different resin materials used separately for an object side and an image side of the lens base plate, chromatic aberration can be corrected very well.

The imaging lens described in claim 3 in the invention described in claim 1 or 2 is characterized in that the object side surface of the second lens has a convex surface at the object side in the vicinity of the optical axis.

Since the second lens has a convex surface made to face the object side, the second lens can share a positive power with the object side surface of the first lens block. Accordingly, it becomes possible to prevent the occurrence of high order spherical aberration.

The imaging lens described in claim 4 in the invention described in any one of claims 1 to 3 is characterized in that the lens base plate is made from a resin material.

In a dicing process to separate a wafer lens into individual lenses, since temperature rises together with stress caused at the time of dicing, the aperture stop, the lens, and the IR cutoff member may peel off or crack sometimes. Since the lens base plate made from a resin material is used, the linear expansion coefficient of the lens base plate can be made close to that of the lens section. Accordingly, in the case where the imaging lens is placed under such a temperature rise at the dicing process or a high temperature at a reflow process, or even under a low temperature environment, it becomes possible to prevent the lens section, the aperture stop, and the IR cutoff member disposed on the lens base plate from peeling off from the lens base plate due to a difference in expansion. Further, since a resin material being rich in toughness is used, even in a thin lens base plate, it becomes possible to reduce cracks due to handling and cracks in deformation due to cure shrinkage after the molding of the lenses, whereby productivity can be improved. In this regard, it may be enough for the above improvement to provide the resin-made lens base plate for at least one of the first lens block and the second lens block.

The imaging lens described in claim 5 in the invention described in any one of claims 1 to 4 is characterized in that the imaging lens further includes a parallel flat plate element between the image side surface of the second lens and the imaging surface of an imaging element, and the parallel flat plate element satisfies the following conditional expression, $$0.20 < t3/f < 0.40 \quad (4)$$

where t3 represents the thickness of the parallel flat plate element (in the case where the imaging lens includes two or more parallel flat plate elements, t3 is the sum total of respective thicknesses).

With the parallel flat plate element disposed between the second lens and the imaging surface of the imaging element, it becomes possible to prevent dust adhering to the imaging lens from dropping onto the imaging surface. Further, with a coating layer is formed on the parallel flat plate element, it becomes possible to provide effects such as IR (infrared) cutoff and reflectance reduction. When the value of the conditional expression (4) is made lower than the upper limit, the thickness of the parallel flat plate element does not become too thick, and it becomes possible to avoid that the entire length of an optical system becomes too large. On the other hand, when the value of the conditional expression (4) is made higher than the lower limit, the thickness of the parallel flat plate element does not become too thin, and it becomes possible to avoid that the handling becomes difficult. Further, it is preferable to satisfy the following conditional expression.

$$0.25 < t3/f < 0.35 \quad (4')$$

The imaging lens described in claim 6 in the invention described in any one of claims 1 to 5 is characterized in that the first lens block and the second lens are joined to each other through a spacer member, and the spacer member is made from a resin material.

Since the first lens block and the second lens are joined to each other through a spacer member, a distance between the first lens block and the second lens can be determined to a predetermined distance. Further, the joining in the above way can refrain decentering or misalignment from occurring after the manufacturing of the lenses. Further, with the spacer member made of a resin material being rich in toughness, even in a thin spacer member, it becomes possible to reduce cracks due to handling and the like. Further, with a dimension change due to the heat expansion of the spacer member, it becomes possible to cancel a change of the back focus caused by a change of the surface configuration of the lens when temperature changes. Furthermore, with this, in the case where resin is used as the material of the first lens block and the second lens, it becomes possible to reduce their volume, and to try to reduce costs and to make the manufacture easier.

The imaging lens described in claim 7 in the invention described in any one of claims 1 to 6 is characterized in that the following conditional expression is satisfied, $$0.43 < D3/f < 0.65 \quad (5)$$

where D3 represents a distance on the optical axis from the object side surface of the first lens block to the object side surface of the second lens.

When the value of the conditional expression (5) is made higher than the lower limit, the object side surface of the second lens becomes closer to the imaging surface, and the entering height of peripheral light rays becomes high. Accordingly, it becomes advantageous for correcting astigmatism and image surface curvature. On the other hand, when the value of the conditional expression (5) is made lower than the upper limit, it becomes possible to prevent the effective diameter of the object side surface of the second lens from becoming too large. Further, it is desirable to satisfy the following conditional expression.

$$0.47 < D3/f < 0.60 \quad (5')$$

The imaging lens described in claim 8 in the invention described in any one of claims 1 to 7 is characterized in that the following conditional expression is satisfied, $$0.27 < D2/f < 0.50 \quad (6)$$

where D2 represents a distance on the optical axis from the object side surface of the first lens block to the image side surface of the first lens block.

When the value of the conditional expression (6) is made higher than the lower limit, the thickness of the first lens block can be prevented from becoming too thin, and the manufacture can be made easier.

On the other hand, when the value of the conditional expression (6) is made lower than the upper limit, the height of axial light rays entering the image side surface of the first lens block becomes high. Accordingly, it becomes advantageous for correcting chromatic aberration and spherical aberration. Further, it is preferable to satisfy the following conditional expression.

$$0.30 < D2/f < 0.40 \quad (6')$$

The imaging lens described in claim 9 in the invention described in any one of claims 1 to 8 is characterized in that the following conditional expression is satisfied, $$20.0 < vlb < 50.0 \quad (7)$$

where vlb represents an Abbe number of the image side lens section of the first lens block.

By the use of the material in a range of the conditional expression (7), it becomes possible to correct chromatic aberration optimally. Further, it is preferable to satisfy the following conditional expression.

$$25.0 < vlb < 45.0 \quad (7')$$

The imaging lens described in claim 10 in the invention described in any one of claims 1 to 9 is characterized in that the following conditional expression is satisfied, $$1.54 < Nla < 1.65 \quad (8)$$

where Nla represents the refractive index of the object side lens section of the first lens block for d line.

By the use of the material in a range of the conditional expression (8), it becomes possible to shorten the overall length and to reduce an image surface curvature. Further, it is preferable to satisfy the following conditional expression.

$$1.55 < Nla < 1.63 \quad (8')$$

The imaging lens described in claim 11 in the invention described in any one of claims 1 to 10 is characterized in that the imaging lens further includes a lens having substantially no power. That is, even in the case where the constitution of claim 1 is provided with a dummy lens having substantially no power, the constitution is within a range to which the present invention can be applied.

An imaging apparatus described in claim 12 is characterized by including the imaging lens described in any one of claims 1 to 11.

By the use of the imaging lens of the present invention, it becomes possible to acquire a small and highly performance imaging apparatus.

A mobile terminal device described in claim 13 is characterized by including the imaging apparatus described in claim 12.

By the use of the imaging apparatus of the present invention, it becomes possible to acquire a smaller and high performance mobile terminal device.

Advantageous Effects of Invention

According to the present invention, it becomes possible to provide an imaging apparatus which has a good aberration performance while being advantageous in the shortening of the optical overall length, can suppress an XY size to be small as a module by making the effective diameter of an optical surface small, and can be produced at low cost with a high performance by realizing an optical design of a wafer scale lens and enabling mass production, and also it becomes possible to provide a mobile terminal device employing the imaging apparatus.

DESCRIPTION OF EMBODIMENT

Hereafter, an embodiment of the present invention will be described based on drawings.

Figure 1:
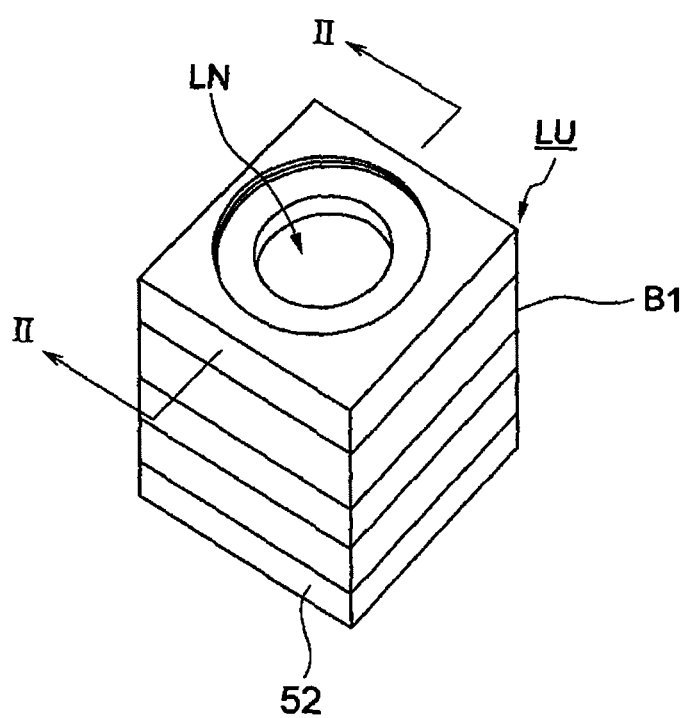
FIG. 1 is a perspective view of an imaging device LU pertaining to this embodiment.
Figure 2:
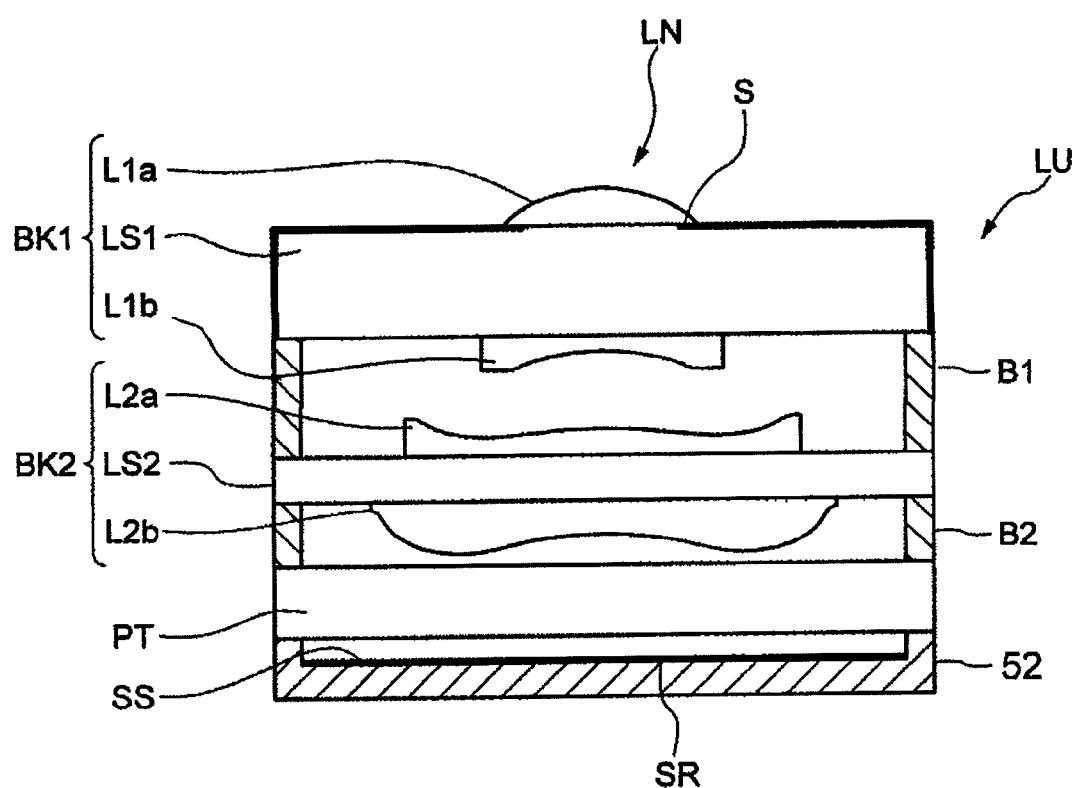
FIG. 2 is a cross sectional view which is cut along a II-II arrowed line in the constitution shown in FIG. 1 and viewed in the arrowed direction.

FIG. 1 is a perspective view of an imaging device LU pertaining to this Example, and FIG. 2 is sectional view which is cut along a II-II arrowed line in the structure of FIG. 1 and viewed in an arrow direction. As shown in FIG. 2, the imaging device LU includes a CMOS type image sensor SR acting as a solid state imaging element having a photoelectrically converting section 51a; an imaging lens LN configured to make the photoelectrically converting section (light receiving surface) SS of this image sensor SR to take an image of a photographic subject; and a base plate 52 which holds the image sensor SR and includes an external connection terminal (not-shown) configured to send and receive electrical signals associated with the image sensor SR. These components are assembled into a single body. The imaging lens LN includes a first lens block BK1 and a second lens block BK2 sequentially from the object side (the upper side in FIG. 2). In place of the second lens block BK2, a second lens of a single lens may be used. Each of these lens blocks BK1 and BK2 is constituted such that, for example, lenses L are linked separately on two opposite surfaces (an object side base plate surface and an image side base plate surface) across a lens base plate LS. Here, the term "linked" means that the base plate surface of the lens base plate LS and the lens are in a state of being directly bonded to each other, or that the base plate surface of the lens base plate LS and the lens are in a state of being indirectly bonded to each other via another member.

On the central portion of the light receiving side flat surface of the image sensor SR, a photoelectrically converting section SS is formed. The photoelectrically converting section SS includes pixels (photoelectrically converting elements) arranged in a two dimensional form, acts as a light receiving section, and is connected to a signal processing circuit (not shown). The signal processing circuit includes a driving circuit section which drives each pixel sequentially so as to acquire signal electrical charges from them, an A/D converting section which converts each signal electrical charge into a digital signal, and a signal processing section which forms an image signal output by using the digital signal. Further, in the vicinity of an outer edge on the flat surface of the image sensor SR, a number of pads (illustration is omitted) are disposed and connected to a base plate 52 via wires (not shown). The image sensor SR is configured to convert signal electric charges from the photoelectrically converting section 51a into image signals, such as digital YUV signals, and outputs them to a predetermined circuit on the base plate 52 through wires (not-shown). Here, Y represents a luminance signal, U (=R−Y) represents a color difference signal between red and a luminance signal, and V (=B−Y) represents a color difference signal between blue and a luminance signal. The solid state imaging element should not be limited to the above CMOS type image sensor, and other sensors, such as CCD may be used as it.

The base plate 52 which supports the image sensor SR is connected via wiring (not shown) so as to be able to communicate with the image sensor SR.

The base plate 52 is connected to an external circuit (for example, a control circuit included in a high rank device of a mobile terminal device in which the imaging device is mounted) via an external connection terminal (not shown), and is enabled to receive the supply of voltage and clock signals to drive the image sensor SR from the external circuit and to output digital YUV signals to the external circuit.

The upper portion of the image sensor SR is sealed with a plate (also referred to a parallel flat plate element) PT, such as an infrared ray cutoff filter fixed to the top surface of the base plate 52. On the upper surface of the plate PT, the lower end of a spacer member B2 is fixed. Further, on the upper end of the spacer member B2, the second lens block BK2 is fixed. On the upper surface of the second lens block BK2, the lower end of another spacer member B1 is fixed. On the upper end of the spacer member B1, the first lens block BK1 is fixed.

The first lens block BK1 includes a first lens base plate LS1 which is a parallel flat plate and made of resin and lens sections L1a and L1b which are fixed respectively onto the object side and image side of the first lens base plate LS1 and made of resin. The second lens block BK2 includes a second lens base plate LS2 which is a parallel flat plate and made of resin and lens sections L2a and L2b which are fixed respectively onto the object side and image side of the second lens base plate LS2 and made of resin. The first lens block BK1 includes a convex surface facing the object side and a concave surface facing the image side and has a positive power, and the peripheral portion of the image side surface of the second lens block BK2 has a positive power. Each of the first lens base plate LS1 and the second lens base plate LS2 may be a glass base plate.

In the first lens block BK1, the object side surface of the object side lens section L1a formed on the object side surface of the first lens base plate LS1 has a convex surface configuration at the object side. Further, the image side surface of the image side lens section L1b formed on the image side surface of the first lens base plate LS1 has a concave surface configuration at the image side. A light shielding film is formed on the object side surface of the first lens base plate LS1, and then a circular aperture capable of allowing light to pass through is formed on the central portion of the light shielding film, whereby an aperture stop S may be formed. However, the aperture stop S is not limited to this.

In the second lens block BK2, the object side surface of the object side lens section L2a formed on the object side surface of the second lens base plate LS2 has a convex surface configuration at the object side in the vicinity of the optical axis. Further, the image side surface of the image side lens section L2b formed on the image side surface of the second lens base plate LS2 has a concave surface configuration at the image side in the vicinity of the optical axis.

Further, the following conditional expressions are filled.

$$0.62 < f1a/f < 0.82 \quad (1)$$

$$-4.00 < f1b/f < -1.11 \quad (2)$$

$$0.70 < D4/f < 1.00 \quad (3)$$

where f1a represents the focal length of the object side lens section of the first lens block, f1b represents the focal length of the image side lens section of the first lens block, D4 represents a distance on the optical axis from the object side surface of the first lens block to the image side surface of the second lens, and f represents the focal length of the imaging lens whole system.

Usually, the imaging lens LN is suitable for use in a digital device with an image inputting function (for example, mobile terminal device). The reason why is that a digital device including a combination of an imaging lens, an image sensor, and the like is made to an imaging device configured to take in an image of a photographic subject optically and to output the image as an electric signal.

An imaging device is a main constitutional component (optical device) of a camera which photographs still images and moving images of an object, and includes, for example, sequentially from the object side (namely, a photographic subject side), an imaging lens which forms an optical image of a photographic subject and an image sensor which converts the optical image formed by the imaging lens into electric signals.

Examples of the camera include a digital camera, a video camera, a monitoring camera, an in-vehicle camera, and a camera for a TV telephone. Further, the camera may be incorporated in or externally attached to a personal computer, a mobile terminal device (for example, compact and portable information device terminal, such as mobile telephone and mobile computer), their peripheral devices (scanner, printer, and the like), and other digital devices.

As can be understood from these examples, installing the imaging device not only constitutes a camera, but also constitutes various devices having a camera function. For example, installing the imaging device constitutes digital devices quipped with an image inputting function, such as a mobile telephone quipped with a camera.

Figure 3:
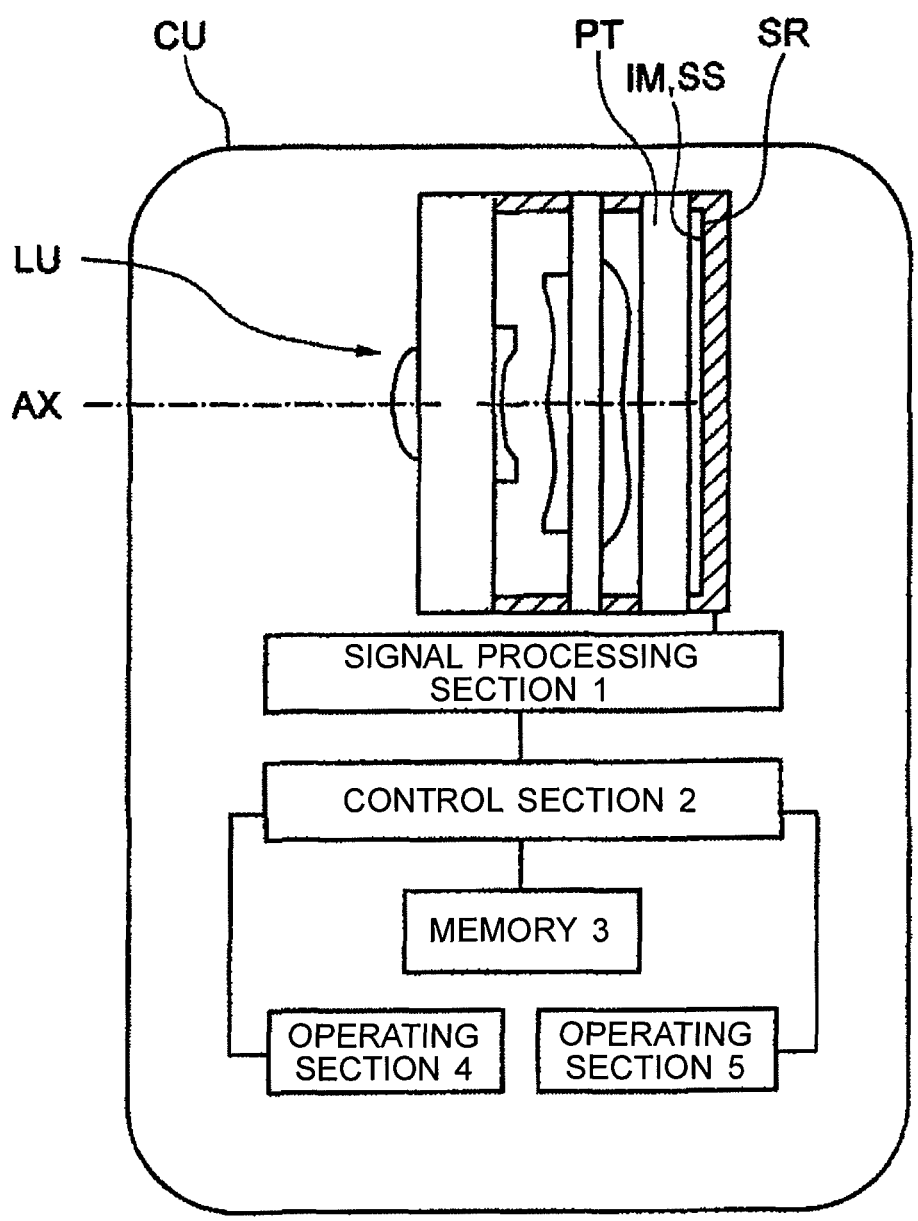
FIG. 3 is an illustration showing a mobile telephone T.

FIG. 3 is a block diagram of a mobile terminal device CU which is an example of digital devices equipped with an image inputting function. In this drawing, the imaging device LU installed in the mobile terminal device CU includes an imaging lens LN, a parallel flat plate element PT, and an image sensor SR (in a certain case, an imaging lens including a parallel flat plate element PT may be called an imaging lens LN).

The imaging lens LN forms an optical image (image plane) IM of an object sequentially from the object (namely, photographic subject) side. If described in full detail, the imaging lens LN includes, for example, lens blocks BK1 and BK2, and forms an optical image IM on the light receiving surface SS of the image sensor SR.

An optical image IM to be formed by the imaging lens LN, for example, is made to pass through an optical low pass filter (the parallel flat plate element PT shown in FIG. 3) which has a predetermined cutoff frequency characteristic determined by the pixel pitch of the image sensor SR. With this passage, spatial frequency characteristics are adjusted so as to minimize so-called folding-back noises generated at the time of being converted into electric signals.

Thus, with this adjustment of these spatial frequency characteristics, occurrence of color moire is suppressed. In this connection, if the performance in the periphery of the resolution limit frequency is suppressed, even if such an optical low pass filter is not used, noises may not occur. Moreover, when a user performs photographing and viewing with a display system (for example, a liquid crystal display of a mobile phone, etc.) where noises are not conspicuous, the optical low pass filter may not be needed.

The parallel flat plate element PT is, for example, an optical filter, such as an optical low pass filter and an infrared cut filter which are arranged if needed (here, the parallel flat plate element PT may correspond to a cover glass of the image sensor SR).

The image sensor SR is configured to convert an optical image IM formed on the light receiving surface SS by the imaging lens LN into electric signals. For example, a CCD (Charge Coupled Device) type image sensor and a CMOS (Complementary Metal-Oxide Semiconductor) type image sensor each of which has two or more pixels may be used as an imaging element (solid state imaging element). The imaging lens LN is positioned so as to form an optical image IM of a photographic subject on a light receiving surface SS of the image sensor SR. Accordingly, an optical image IM formed by the imaging lens LN is efficiently converted into electric signals by the image sensor SR.

In the case where such an imaging device LU is installed in a mobile terminal device CU equipped with an image inputting function, the imaging device LU is usually arranged inside the body of the mobile terminal device CU. However, when the mobile terminal device CU performs the camera function, the imaging device LU is made in a configuration in response to a need. For example, a unitized imaging device LU may be made to be detachable or rotatable relative to the main body of the mobile terminal device CU.

Here, the mobile terminal device CU includes, in addition to the imaging device LU, a signal processing section 1, a control section 2, a memory 3, an operating section 4, and a display 5.

The signal processing section 1 is configured to apply prescribed digital image processing and image compression processing for signals generated by the image sensor SR if needed. Subsequently, the signals having been applied with the processing may be recorded in the memory 3 (a semiconductor memory, an optical disk, and the like) as digital image signals, or may be converted into infrared signals through a cable and transmitted to other devices.

The control section 2 is a microcomputer and performs intensively functional control, such as a photographing function, an image reproducing function, and the like. For example, the control section 2 controls the imaging device LU to perform at least one of static image photography and moving image photography for a photographic subject.

The memory 3 is configured to memorize signals which have been produced by the image sensor SR and processed by the signal processing section 1.

The operating section 4 is a section including operating members, such as a manual operation button (for example, a release button) and an operation dial (for example, a photography mode dial), and is configured to transmit the information input by an operation of an operator to the control section 2.

The display section 5 is a section including a display, such as a liquid crystal monitor, and performs image display by using image signals converted by the image sensor SR and image information recorded in the memory 3.

Figure 4:
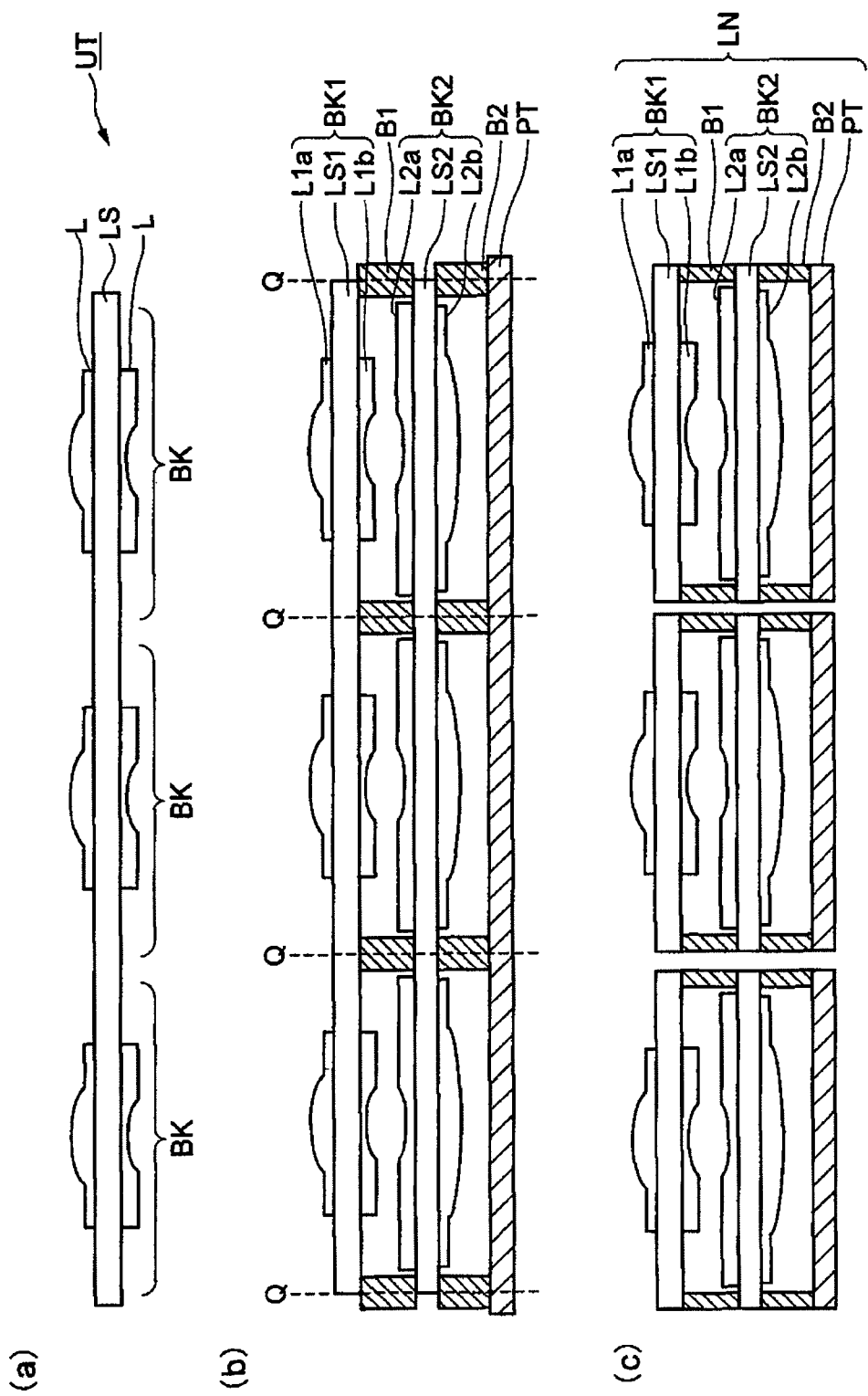
FIG. 4 is a schematic diagram showing manufacturing processes (a), (b), and (c) of an imaging lens LN.

Hereafter, the manufacturing method of the imaging lens LN will be described. In here, description is given to the case where the first lens block and the second lens block are manufactured with a replica method. However, only the first lens block may be manufactured with the replica method, a second lens may be produced as a single lens by injection molding, and then the both of the first lens block and the second lens may be joined to each other. The lens block unit UT which includes two or more lens blocks BK arranged side by side as shown in the sectional view of FIG. 4(a) is manufactured, for example, by the replica method which can produce a number of lenses simultaneously at low cost (here, the number of lens blocks BK included in the lens block unit UT may be a single number or may be a plural number).

Further, in the replica method, a hardenable resin material is shaped in a lens configuration by using a molding die and transferred to a resin base plate. With this, according to the replica method, a number of lenses are produced simultaneously on the resin base plate. At this time, resin is dropped to the whole surface, and then a plurality of lenses may be formed at one time with a molding die. Alternatively, resin is dropped separately, and then a small group of lenses are molded repeatedly separately by stamping the same molding die. Furthermore, a number of lenses may be manufactured by another manufacturing method without limiting to the replica method.

Subsequently, from the lens block unit UT manufactured by these methods, the imaging lens LN is manufactured. One example of the manufacturing process of this imaging lens is shown in the outlined cross sectional view of FIG. 4 (b).

The first lens block unit UT1 is constituted by a first lens base plate LS1 being a parallel flat plate, a lens section L1a bonded on one flat surface of the first lens base plate LS1, and a lens section L1b bonded on another flat surface of the first lens base plate LS1.

The second lens block unit UT2 is constituted by a second lens base plate LS2 being a parallel flat plate, a lens section L2a bonded on one flat surface of the second lens base plate LS2, and a lens section L2b bonded on another flat surface of the second lens base plate LS2.

A lattice-like spacer member B1 intervenes between the first lens block unit UT1 and the second lens block unit UT2 (specifically between the first lens base plate LS1 and the second lens base plate LS2), and keeps a constant space between both the lens block units UT1 and UT2. Furthermore, a spacer member B2 intervenes between the parallel flat plate element PT and the second lens block unit UT2, and keeps a constant space between the parallel flat plate element PT and the second lens block unit UT2 (that is, the spacer members B1 and B2 can be called a two-staged lattice). Then, at a position of each of holes of the spacer members B1 and B2, a group of the lens sections L1a, L1b, L2a, and L2b is located.

Here, the parallel flat plate element PT is a parallel flat plate (equivalent to the parallel flat plate element PT in FIG. 3) of a wafer level sensor chip size package including a micro lens array, a sensor cover glass, or an IR cutoff filter.

Further, with the constitution that the spacer member B1 intervenes between the first lens block unit UT1 and the second lens block unit UT2 and the spacer member B2 intervenes between the second lens block unit UT2 and the parallel flat plate element PT, the lens base plates LS (the first lens base plate LS1 and the second lens base plate LS2) are sealed from each other and integrated into a single body.

Subsequently, the integrated components of the first lens base plate LS1, the second lens base plate LS2, the spacer members B1 and B2, and the parallel flat plate element PT are cut along the frame (positions shown with broken lines Q) of the lattice of the spacer members B1 and B2, thereby acquiring a plurality of imaging lenses LN each of which has a two lens constitution.

Thus, the imaging lenses LN are manufactured by cutting out the member in which a plurality of lens blocks (the first lens blocks BK1 and the second lens blocks BK2) are incorporated. As a result, the adjustment between lenses and the assembling process for each imaging lens LN are not needed. Accordingly, the mass production of the imaging lenses LN becomes possible.

Further, the spacer member B1 and B2 are shaped in the form of a lattice. Accordingly, when the imaging lenses LN are cut out from the member into which a plurality of lens blocks BK1 and BK2 are incorporated, the spacer member B1 and B2 become marks for cutting out. Therefore, since the imaging lenses LN are simply cut out from the member where a plurality of lens blocks BK1 and BK2 are incorporated, time and labor are not needed. As a result, the imaging lenses LN can be produced in large numbers at low cost.

In light of the above, a manufacturing method of the imaging lens LN includes: a connecting process of arranging a spacer member B1 on at least a part of respective peripheries of lens blocks BK1 and BK2 and connecting a plurality of lens block units UT1 and UT2 by interposing the spacer member B1, and a cutting process of cutting the connected lens block units UT1 and UT2 along the spacer member B1. Such a manufacturing method suits the mass production of a cheap lens system.

EXAMPLE

Next, description will be given to examples suitable for the above-mentioned embodiment. However, the present invention should not be limited the examples shown below. The meaning of each symbol in the examples is as follows.

FL: Focal length of an imaging lens whole system
Fno: F number
Ymax: Diagonal line length of the imaging surface of a solid state imaging element
w: Half angle of view
TL: Distance on the optical axis from a lens surface positioned closest to the object side in an imaging lens whole system to an image side focal point
BF: Back focus
r: Radius of curvature
d: Axial face-to-face spacing
nd: Refractive index of a lens material to d line
vd: Abbe number of a lens material to d line Here, in the case of a lens section formed on the object side of a lens base plate, the focal length of each lens section is a value measured on the condition that the object side and the image side of the lens are filled with air. Also, in the case of a lens section formed on the image side of a lens base plate, the focal length of each lens section is a value measured on the condition that the object side and the image side of the lens are filled with air.

In each example, a face in which the mark "*" is described at a position behind a face number is a face having an aspheric surface configuration. The aspheric surface configuration is represented by the following [Math. 1] in which the apex of the face is made as an origin, an X axis is taken in the optical axis direction, and h represents a height in a direction perpendicular to the optical axis.

$$X = \frac{h^2/R}{1+\sqrt{1-(1+K)h^2/R^2}} + \sum A_i h^i \quad \text{[Math. 1]}$$

In [Math. 1], Ai represents an i-th order aspheric surface coefficient, R represents a basic curvature radius, and K represents a cone constant.

Here, with regard to the meaning of an axial curvature radius described in claims and examples, in the situation of actual measurement of a lens, an approximate curvature radius obtained by fitting shape measurement values in the vicinity of the lens central portion (in concrete terms, a central region within 10% or less to a lens outer diameter) with a least-square method can be deemed as an axial curvature radius.

Further, for example, when the second order aspheric surface coefficient is used, a curvature radius in which a second order aspheric surface coefficient is taken for consideration on a basic curvature radius in an aspheric surface definitional equation can be deemed as an axial curvature radius (for example, as a reference document, refer to pages 41 to 42 of "Lens Design Method" written by Yoshiya Matsui (published by Kyoritsu Publishing Corporation).

Furthermore, hereinafter (including lens data), the number of power of 10 (for example, 2.5×10-02) is represented by use of E (for example 2.5e-002). In addition, the face number in lens data is provided sequentially from the object side of the first lens which is named as the first face. Here, the unit of a numeral representing a length described in Example is "mm".

Example 1

Figure 5:
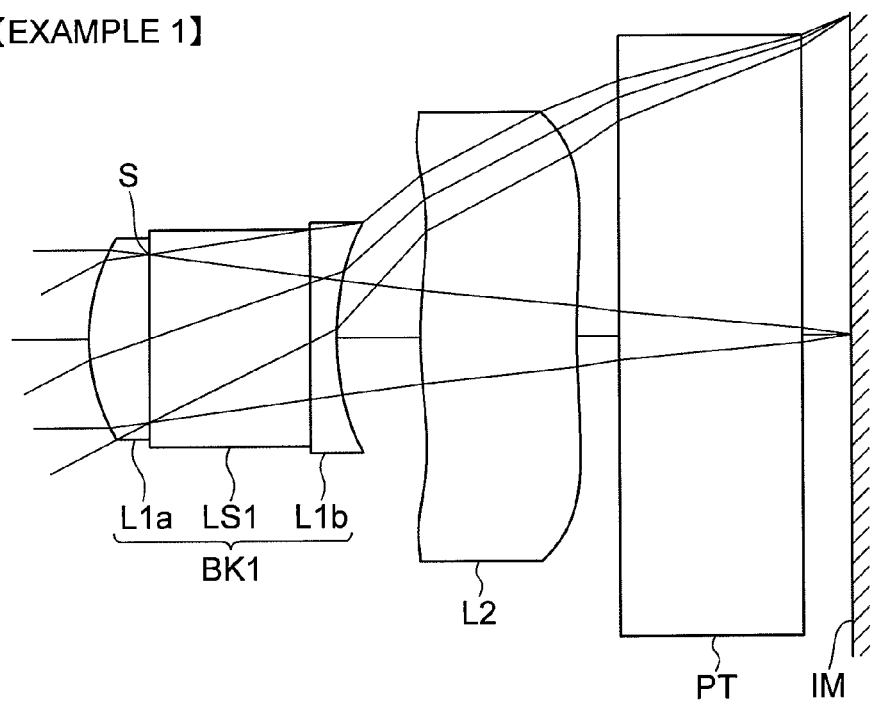
FIG. 5 is a cross sectional view of the imaging lens pertaining to Example 1.

Lens data in Example 1 are shown in Table 1. FIG. 5 is a cross sectional view of the lens of Example 1. A first object side lens section L1a, an aperture stop S, a first lens base plate LS1, and a first image side lens section L1b are disposed sequentially from the object side and constitute a first lens block BK1 with a positive power. Next, a second lens L2 of a single lens is arranged, and lastly, a parallel flat plate element PT as which a seal glass of a solid state imaging element or the like is supposed is disposed. The symbol "IM" represents the imaging surface of the solid state imaging element.

Example 1

TABLE 1

Reference Wave Length = 587.56 nm
unit: mm

Construction Data

| NUM. | r | d | nd | vd | eff. diameter |
|---|---|---|---|---|---|
| OBJ | INFINITY | 400.0000 | | | |
| 1* | 0.4873 | 0.1190 | 1.56587 | 34.99 | 0.453 |
| STO | INFINITY | 0.3089 | 1.51690 | 61.89 | 0.377 |
| 3 | INFINITY | 0.0500 | 1.56494 | 34.99 | 0.487 |
| 4* | 0.8057 | 0.1591 | | | 0.520 |
| 5* | 1.2157 | 0.3045 | 1.51500 | 51.99 | 0.724 |
| 6* | 2.5787 | 0.0851 | | | 1.003 |
| 7 | INFINITY | 0.3500 | 1.47140 | 66.01 | 1.136 |
| 8 | INFINITY | 0.0676 | | | 1.332 |
| IMG | INFINITY | 0.0329 | | | |

ASPHERICAL SURFACE

1: K = 1.65918e+000, A3 = −7.87366e−001, A4 = 5.83475e+000,
A5 = −1.23052e+001, A6 = −1.42136e+002, A8 = 3.02996e+003,
A10 = −3.57451e+004, A12 = 1.43968e+005
4: K = −5.65823e+001, A3 = 6.28068e−001,
A4 = 3.00129e+000, A6 = 7.74543e+001, A8 = −1.99521e+003,
A10 = 8.84810e+003, A12 = 1.68638e+005, A14 = 2.64918e+005,
A16 = −1.75174e+007, A18 = −1.99876e+007
5: K = −3.00000e+001, A4 = −1.58845e+000, A6 = −2.99162e+001,
A8 = 5.86010e+002, A10 = −5.96898e+003,
A12 = 3.35530e+004, A14 = −9.12256e+004,
A16 = 9.30355e+004
6: K = −7.56873e+000, A4 = −8.51293e−001, A6 = −7.78094e+000,
A8 = 3.84309e+001, A10 = −1.23938e+002,
A12 = 1.22997e+002, A14 = 1.99080e+002, A16 = −6.24597e+002

| | | |
|---|---|---|
| FL | | 1.1510 |
| Fno | | 2.8815 |
| w | | 60.3285 |
| Ymax | | 0.7140 |
| BF | | 0.4235 |
| TL | | 1.3650 |

| Elem | Surfs | Focal Length | Diameter |
|---|---|---|---|
| 1 | 1-4 | 1.401018 | 0.5197 |
| 2 | 5-6 | 4.150589 | 1.0029 |

Figure 6:
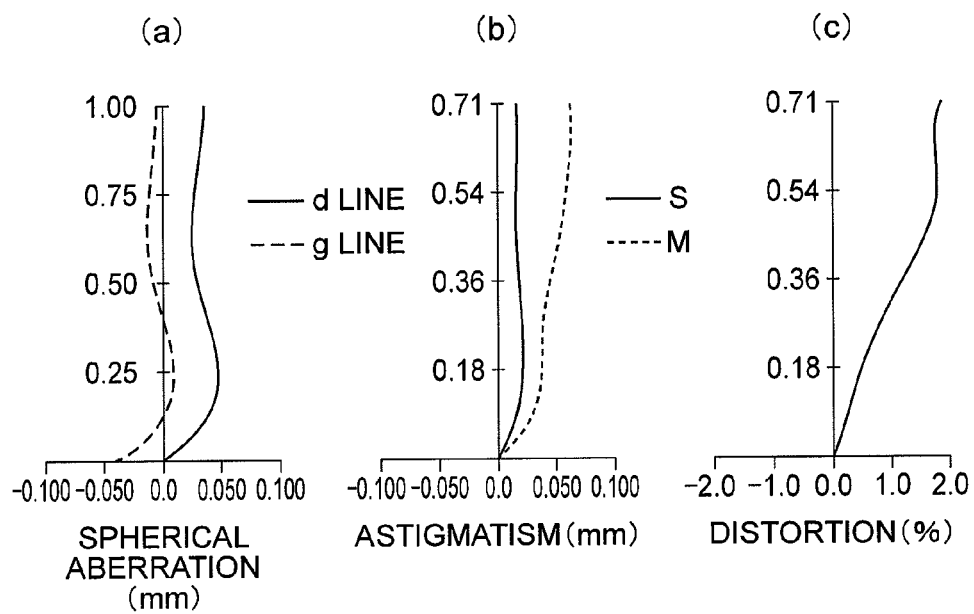
FIG. 6 is an aberration diagram of spherical aberration (a), astigmatism (b), and distortion (c) of the imaging lens pertaining to Example 1.

FIG. 6 is an aberration diagram (spherical aberration (a), astigmatism (b), and distortion (c)) of Example 1. Herein, in the spherical aberration diagram and the meridional coma aberration diagram, a solid line represents an amount of spherical aberration and an amount of meridional coma aberration for a d line, and a dotted line represents an amount of spherical aberration and an amount of meridional coma aberration for a g line, and in the astigmatic diagram, a solid line represents a sadital surface, and a dotted line represents a meridional surface (hereinafter, the same is applied).

Example 2

Figure 7:
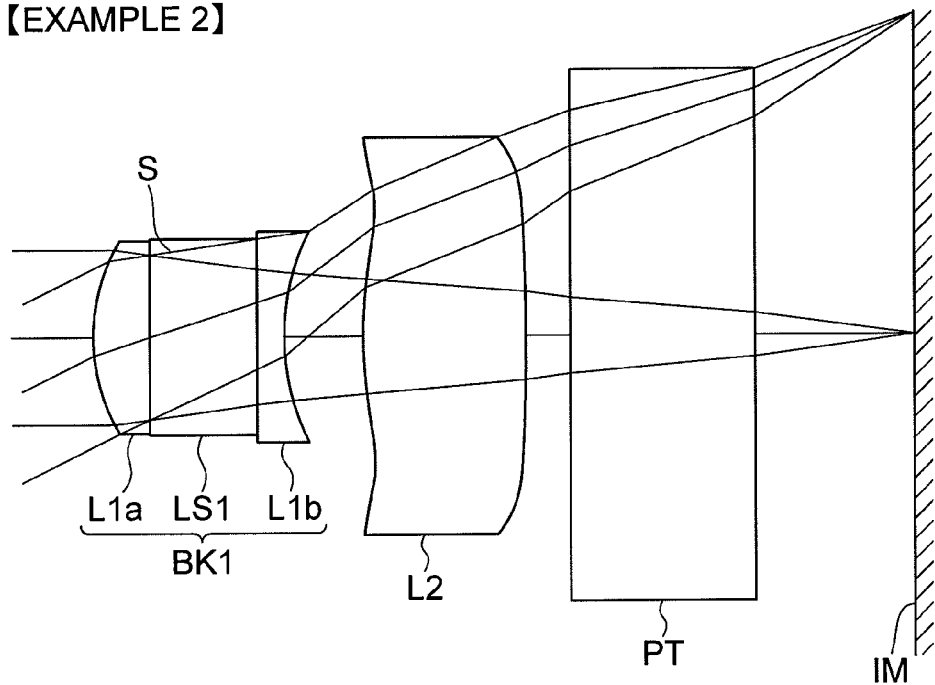
FIG. 7 is a cross sectional view of the imaging lens pertaining to Example 2.

Lens data in Example 2 are shown in Table 2. FIG. 7 is a cross sectional view of the lens of Example 2. A first object side lens section L1a, an aperture stop S, a first lens base plate LS1, and a first image side lens section L1b are disposed sequentially from the object side and constitute a first lens block BK1 with a positive power. Next, a second lens L2 of a single lens is arranged, and lastly a parallel flat plate element PT as which a seal glass of a solid state imaging element or the like is supposed is disposed. The symbol "IM" represents the imaging surface of the solid state imaging element.

Example 2

TABLE 2

Reference Wave Length = 587.56 nm
unit: mm

Construction Data

| NUM. | r | d | nd | vd | eff. diameter |
|---|---|---|---|---|---|
| OBJ | INFINITY | 400.0000 | | | |
| 1* | 0.4959 | 0.1058 | 1.56587 | 34.99 | 0.433 |
| STO | INFINITY | 0.2000 | 1.51690 | 61.89 | 0.370 |
| 3 | INFINITY | 0.0500 | 1.56494 | 34.99 | 0.439 |
| 4* | 0.7285 | 0.1466 | | | 0.472 |
| 5* | 1.2258 | 0.3000 | 1.51500 | 51.99 | 0.650 |
| 6* | −5.1894 | 0.0851 | | | 0.885 |
| 7 | INFINITY | 0.3500 | 1.47140 | 66.01 | 0.998 |
| 8 | INFINITY | 0.2238 | | | 1.184 |
| IMG | INFINITY | 0.0722 | | | |

ASPHERICAL SURFACE

1: K = 2.83968e+000, A3 = −3.99623e−001, A4 = 2.45457e+000,
A5 = −1.89676e+001, A6 = −1.01073e+002, A8 = 3.13669e+003,
A10 = −4.58398e+004, A12 = 5.14751e+003
4: K = −1.15325e+002, A3 = 3.47401e+000, A4 = −6.62006e+000,
A6 = 4.35694e+001, A8 = −9.79704e+002,
A10 = 1.66214e+004, A12 = 8.83191e+004, A14 = −2.07937e+006,
A16 = −4.32312e+007, A18 = 5.94464e+008
5: K = 1.00110e+001, A4 = −9.30582e−001, A6 = −4.99360e+001,
A8 = 6.32117e+002, A10 = −5.61766e+003,
A12 = 2.80249e+004, A14 = −1.53557e+005,
A16 = 4.75995e+005
6: K = 1.39021e+001, A4 = 1.10879e+000, A6 = −1.49539e+001,
A8 = 4.35373e+001, A10 = −8.99008e+001,
A12 = 1.23256e+002, A14 = −1.51511e+003,
A16 = 3.09747e+003

| | |
|---|---|
| FL | 1.1203 |
| Fno | 2.8815 |
| w | 61.1451 |
| Ymax | 0.7140 |
| BF | 0.6126 |
| TL | 1.4149 |

| Elem | Surfs | Focal Length | Diameter |
|---|---|---|---|
| 1 | 1-4 | 1.753357 | 0.4717 |
| 2 | 5-6 | 1.956544 | 0.8851 |

Figure 8:
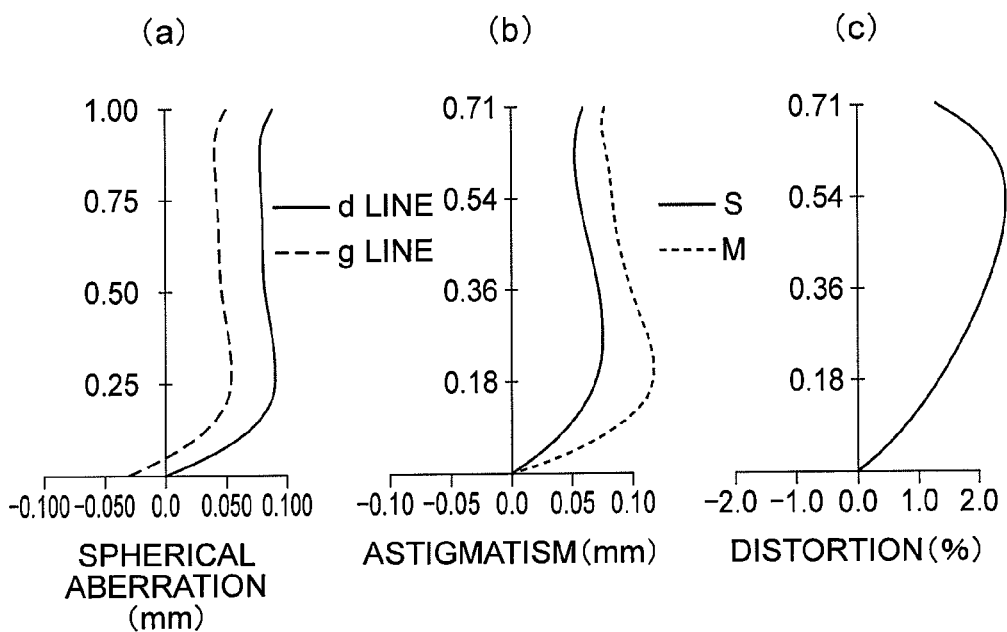
FIG. 8 is an aberration diagram of spherical aberration (a), astigmatism (b), and distortion (c) of the imaging lens pertaining to Example 2.

FIG. 8 is an aberration diagram (spherical aberration (a), astigmatism (b), and distortion (c)) of Example 2.

Example 3

Figure 9:
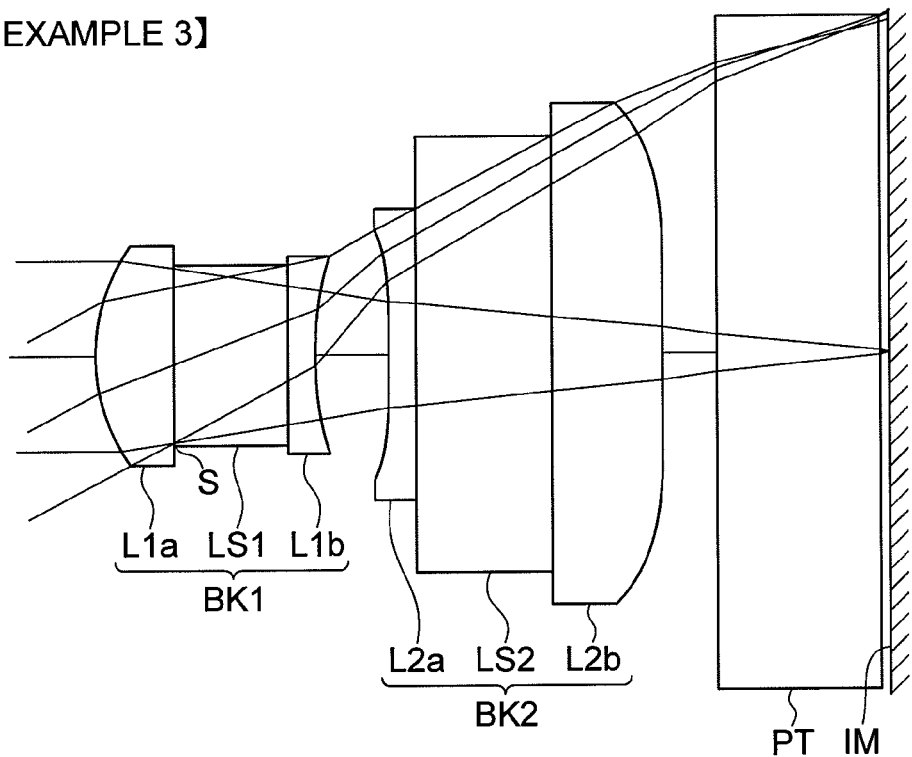
FIG. 9 is a cross sectional view of the imaging lens pertaining to Example 3.

Lens data in Example 3 are shown in Table 3. FIG. 9 is a cross sectional view of the lens of Example 3. A first object side lens section L1a, an aperture stop S, a first lens base plate LS1, and an image side lens section L1b are disposed sequentially from the object side and constitute a first lens block BK1. Next, a second object side lens section L2a, a second lens base plate LS2, and a second image side lens section L2b are disposed sequentially from the object side and constitute a second lens block BK2. Lastly, a parallel flat plate element PT as which a seal glass of a solid state imaging element or the like is supposed is disposed. The symbol "IM" represents the imaging surface of the solid state imaging element.

Example 3

TABLE 3

Reference Wave Length = 587.56 nm
unit: mm

Construction Data

| NUM. | r | d | nd | vd | eff. diameter |
|---|---|---|---|---|---|
| OBJ | INFINITY | 400.0000 | | | |
| 1* | 0.4401 | 0.1434 | 1.56289 | 34.99 | 0.462 |
| STO | INFINITY | 0.2052 | 1.52000 | 52.99 | 0.367 |
| 3 | INFINITY | 0.0500 | 1.56289 | 34.99 | 0.380 |
| 4* | 0.9554 | 0.1358 | | | 0.416 |
| 5* | −131.0666 | 0.0499 | 0.56289 | 34.99 | 0.529 |
| 6 | INFINITY | 0.2500 | 1.52000 | 52.99 | 0.616 |
| 7 | INFINITY | 0.2050 | 1.56289 | 34.99 | 0.917 |
| 8* | 23.6946 | 0.1000 | | | 1.053 |
| 9 | INFINITY | 0.3000 | 1.47400 | 56.39 | 1.215 |
| 10 | INFINITY | −0.0038 | | | 1.412 |
| IMG | INFINITY | 0.0200 | | | |

ASPHERICAL SURFACE

1: K = 2.95228e−002, A4 = −1.33842e+000, A6 = 8.72220e+001,
A8 = −2.11581e+003, A10 = 1.70180e+004
4: K = 1.03340e+001, A4 = 1.35867e+000, A6 = −1.19278e+002,
A8 = 4.34554e+003, A10 = −4.85266e+004
5: K = 1.00215e+003, A4 = −4.90104e+000, A6 = 2.05682e+001,
A8 = −2.74401e+002, A10 = −3.90403e+003, A12 = 6.36983e+004,
A14 = −2.57140e+005
8: K = −2.78766e+001, A4 = −2.55967e−001, A6 = −6.39372e+000,
A8 = 1.76376e+001, A10 = −2.56484e+001

| | |
|---|---|
| FL | 1.1412 |
| Fno | 2.8600 |
| w | 62.5392 |
| Ymax | 0.7140 |
| BF | 0.3197 |
| TL | 1.3591 |

| Elem | Surfs | Focal Length | Diameter |
|---|---|---|---|
| 1 | 1-4 | 1.130203 | 0.4620 |
| 2 | 5-8 | −35.607068 | 1.0527 |

Figure 10:
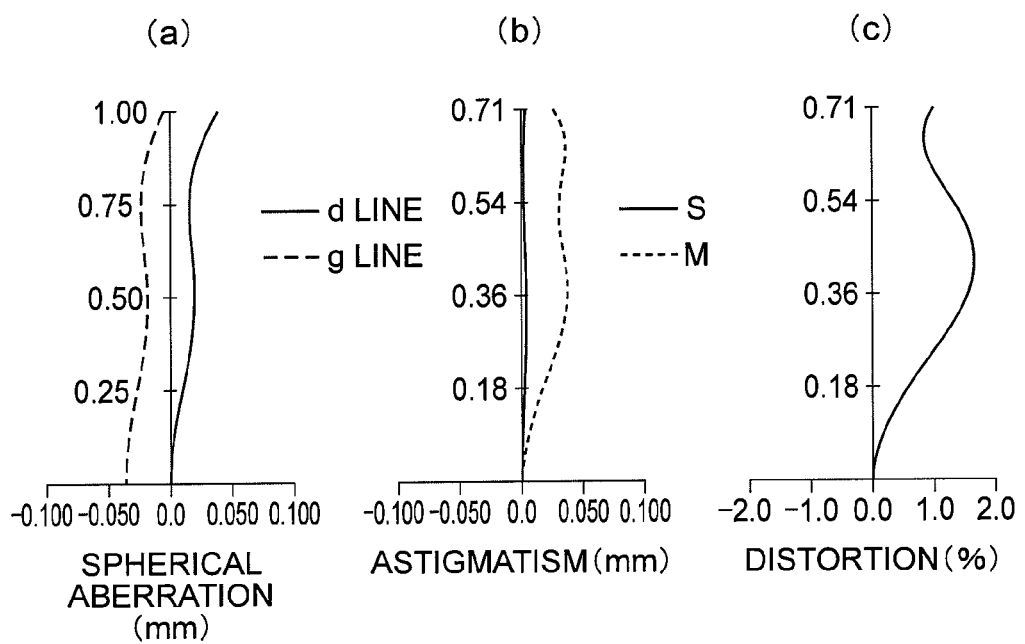
FIG. 10 is an aberration diagram of spherical aberration (a), astigmatism (b), and distortion (c) of the imaging lens pertaining to Example 3.

FIG. 10 is an aberration diagram (spherical aberration (a), astigmatism (b), and distortion (c)) of Example 3.

Example 4

Lens data in Example 4 are shown in Table 4.

Figure 11:
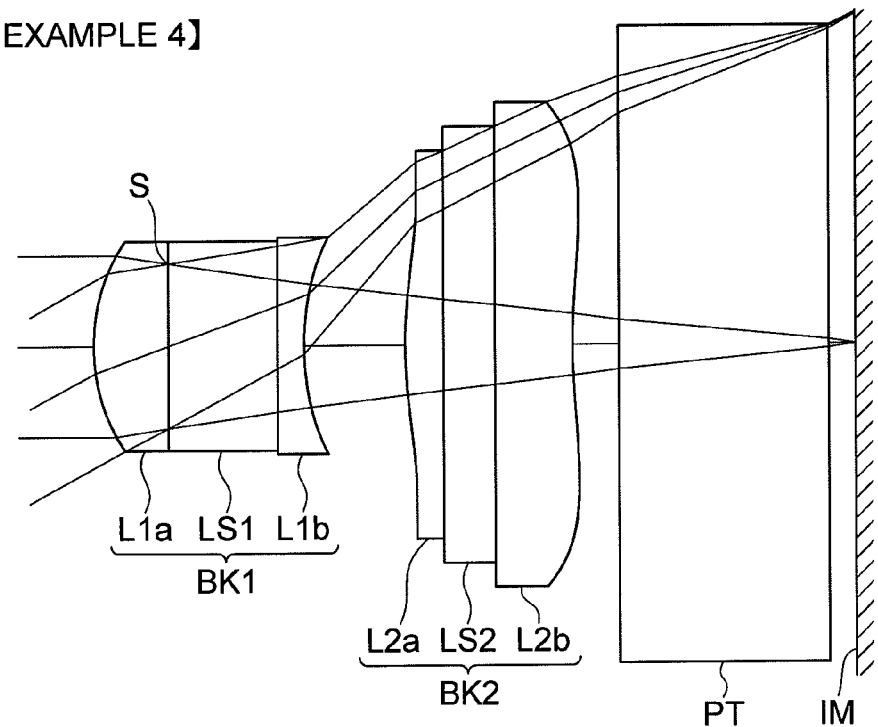
FIG. 11 is a cross sectional view of the imaging lens pertaining to Example 4.

FIG. 11 is a cross sectional view of the lens of Example 4. A first object side lens section L1a, an aperture stop S, a first lens base plate LS1, and an image side lens section L1b are disposed sequentially from the object side and constitute a first lens block BK1. Next, a second object side lens section L2a, a second lens base plate LS2, and a second image side lens section L2b are disposed sequentially from the object side and constitute a second lens block BK2. Lastly, a parallel flat plate element PT as which a seal glass of a solid state imaging element or the like is supposed is disposed. The symbol "IM" represents the imaging surface of the solid state imaging element.

Example 4

TABLE 4

Reference Wave Length = 587.56 nm
unit: mm

Construction Data

| NUM. | r | d | nd | vd | eff. diameter |
|---|---|---|---|---|---|
| OBJ | INFINITY | 400.0000 | | | 0.000 |
| 1* | 0.4630 | 0.1392 | 1.56587 | 34.99 | 0.455 |
| STO | INFINITY | 0.2050 | 1.51690 | 61.89 | 0.357 |
| 3 | INFINITY | 0.0500 | 1.56494 | 34.99 | 0.435 |
| 4* | 0.7131 | 0.1934 | | | 0.470 |
| 5* | 1.0165 | 0.0733 | 1.56587 | 34.99 | 0.791 |
| 6 | INFINITY | 0.1000 | 1.51690 | 61.89 | 0.841 |
| 7 | INFINITY | 0.1489 | 1.51617 | 55.99 | 0.943 |
| 8* | 1.9846 | 0.0851 | | | 1.045 |
| 9 | INFINITY | 0.4000 | 1.47140 | 66.01 | 1.156 |
| 10 | INFINITY | 0.0337 | | | 1.373 |
| IMG | INFINITY | 0.0189 | | | |

ASPHERICAL SURFACE

1: K = 1.45390e+000, A3 = −7.24831e−001, A4 = 5.42784e+000,
A5 = −9.58421e+000, A6 = −1.33157e+002, A8 = 2.63640e+003,
A10 = −3.73321e+004, A12 = 2.24055e+005
4: K = −1.00860e+002,
A3 = 1.64973e+000, A4 = 2.31647e+000, A6 = 4.49760e+001,
A8 = −1.97183e+003,
A10 = 1.23904e+004, A12 = 2.49476e+005, A14 = 9.55310e+005,
A16 = −2.59728e+007, A18 = −3.57101e+008
5: K = −3.50689e+001, A4 = −3.67584e−001, A6 = −3.05948e+001,
A8 = 5.93690e+002, A10 = −5.98207e+003,
A12 = 3.31288e+004, A14 = −9.31231e+004,
A16 = 1.04191e+005
8: K = 3.08075e+000, A4 = −1.31342e+000, A6 = −4.36704e+000,
A8 = 3.52088e+001, A10 = −1.27175e+002,
A12 = 1.00962e+002, A14 = 2.54701e+002, A16 = −3.05267e+002

| | | |
|---|---|---|
| FL | | 1.1147 |
| Fno | | 2.8815 |
| w | | 64.3536 |
| Ymax | | 0.7140 |
| BF | | 0.4095 |
| TL | | 1.3194 |

| Elem | Surfs | Focal Length | Diameter |
|---|---|---|---|
| 1 | 1-4 | 1.474927 | 0.4705 |
| 2 | 5-8 | 3.056598 | 1.0452 |

Figure 12:
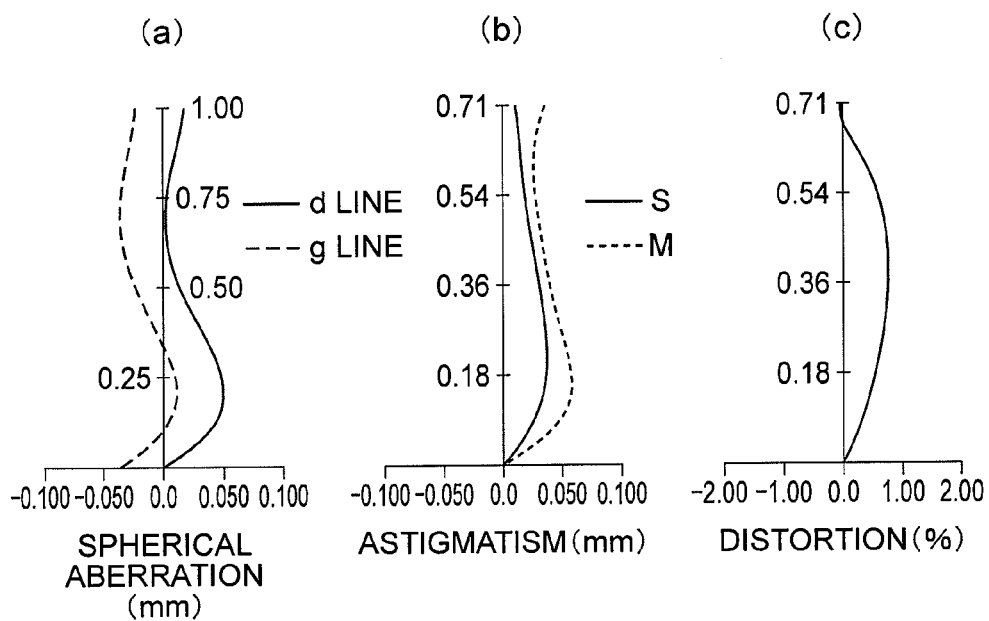
FIG. 12 is an aberration diagram of spherical aberration (a), astigmatism (b), and distortion (c) of the imaging lens pertaining to Example 4.

FIG. 12 is an aberration diagram (spherical aberration (a), astigmatism (b), and distortion (c)) of Example 4.

Example 5

Figure 13:
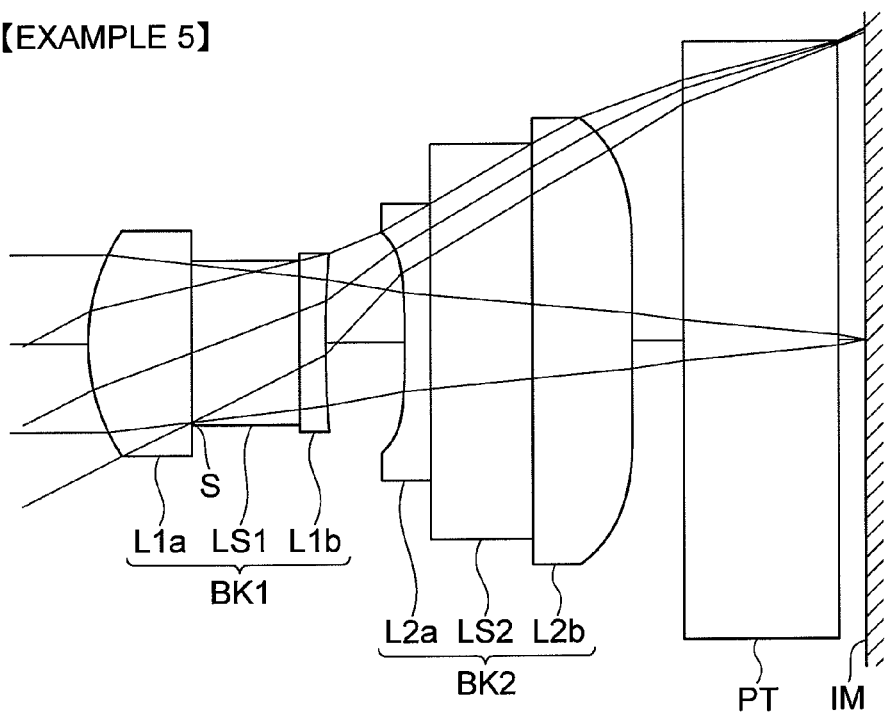
FIG. 13 is a cross sectional view of the imaging lens pertaining to Example 5.

Lens data in Example 5 are shown in Table 5. FIG. 13 is a cross sectional view of the lens of Example 5. A first object side lens section L1*a*, an aperture stop S, a first lens base plate LS1, and an image side lens section L1*b* are disposed sequentially from the object side and constitute a first lens block BK1. Next, a second object side lens section L2*a*, a second lens base plate LS2, and a second image side lens section L2*b* are disposed sequentially from the object side and constitute a second lens block BK2. Lastly, a parallel flat plate element PT as which a seal glass of a solid state imaging element or the like is supposed is disposed. The symbol "IM" represents the imaging surface of the solid state imaging element.

Example 5

TABLE 5

Reference Wave Length = 587.56 nm
unit: mm

Construction Data

| NUM. | r | d | nd | vd | eff. diameter |
|---|---|---|---|---|---|
| OBJ | INFINITY | 400.0000 | | | |
| 1* | 0.5238 | 0.2000 | 0.56289 | 34.99 | 0.515 |
| STO | INFINITY | 0.2050 | 1.52000 | 52.99 | 0.359 |
| 3 | INFINITY | 0.0500 | 1.56289 | 34.99 | 0.380 |
| 4* | 2.4613 | 0.1551 | | | 0.413 |
| 5* | −11.5163 | 0.0500 | 1.51720 | 56.27 | 0.507 |
| 6 | INFINITY | 0.2000 | 1.52000 | 52.99 | 0.637 |
| 7 | INFINITY | 0.1926 | 1.56289 | 34.99 | 0.906 |
| 8* | 6.1743 | 0.1000 | | | 1.024 |
| 9 | INFINITY | 0.3000 | 1.47400 | 56.39 | 1.194 |
| 10 | INFINITY | 0.0263 | | | 1.368 |
| IMG | INFINITY | 0.0270 | | | |

ASPHERICAL SURFACE

1: K = −1.21742e+000, A4 = −2.56387e−001, A6 = 7.29057e+001,
A8 = −3.09998e+003, A10 = 8.17950e+004, A12 = −1.26684e+006,
A14 = 1.02562e+007, A16 = −3.23908e+007
4: K = 3.00000e+001, A4 = −2.26301e−001, A6 = −1.14109e+002,
A8 = 3.31290e+003, A10 = −4.02841e+004, A12 = −4.11162e+002,
A14 = −1.43176e+003, A16 = 2.98287e+004
5: K = −3.00000e+001, A4 = −8.55698e+000, A6 = 6.98454e+001,
A8 = −4.17210e+002, A10 = −4.10570e+004, A12 = 5.19506e+005,
A14 = 3.41692e+006, A16 = −9.23239e+007
8: K = −3.00000e+001, A4 = −6.30900e−001, A6 = −1.07823e+001,
A8 = 6.64253e+001, A10 = −2.41169e+002,
A12 = 2.79477e+002, A14 = 4.92080e+002, A16 = −1.38644e+003

| | | |
|---|---|---|
| FL | | 1.1519 |
| Fno | | 2.8600 |
| w | | 62.6494 |
| Ymax | | 0.7140 |
| BF | | 0.3498 |
| TL | | 1.4026 |

| Elem | Surfs | Focal Length | Diameter |
|---|---|---|---|
| 1 | 1-4 | 1.088980 | 0.5208 |
| 2 | 5-8 | −7.285662 | 1.0644 |

Figure 14:
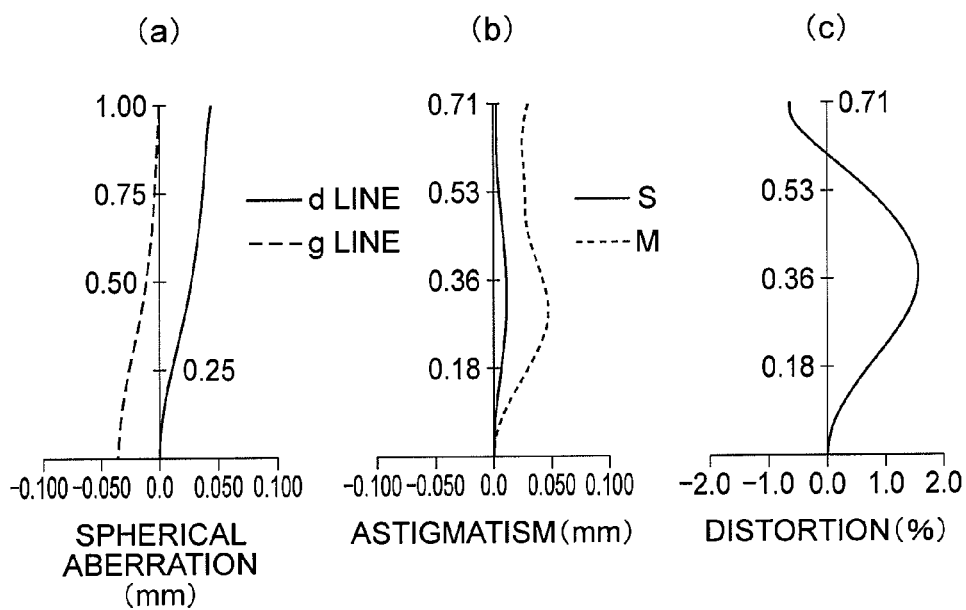
FIG. 14 is an aberration diagram of spherical aberration (a), astigmatism (b), and distortion (c) of the imaging lens pertaining to Example 5.

FIG. 14 is an aberration diagram (spherical aberration (a), astigmatism (b), and distortion (c)) of Example 5.

Example 6

Figure 15:
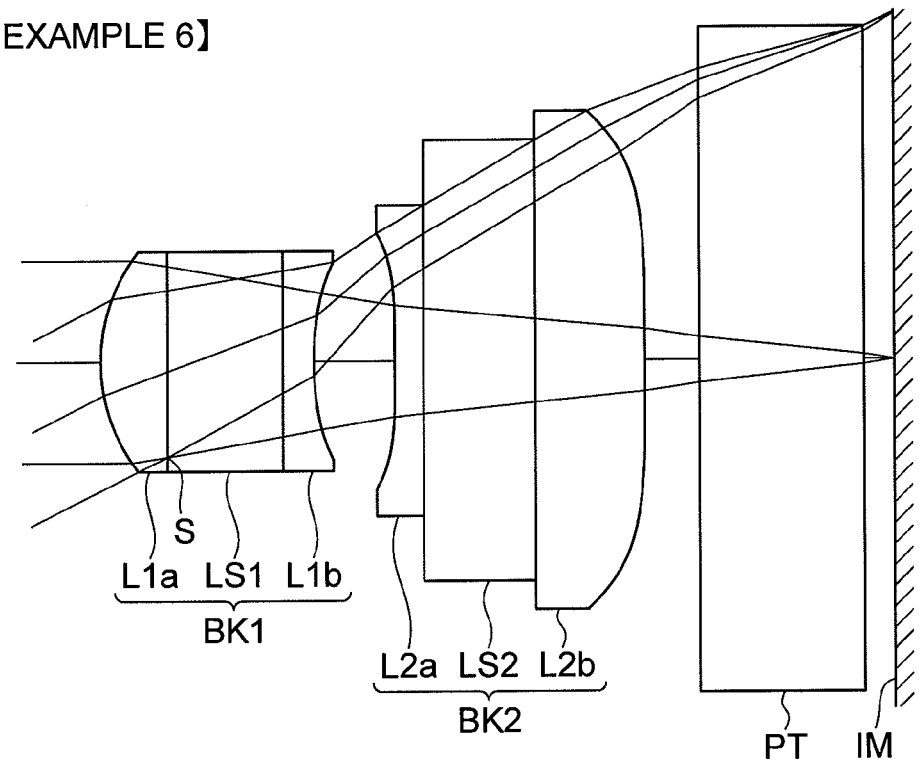
FIG. 15 is a cross sectional view of the imaging lens pertaining to Example 6.

Lens data in Example 6 are shown in Table 6. FIG. 15 is a cross sectional view of the lens of Example 6. A first object side lens section L1*a*, an aperture stop S, a first lens base plate LS1, and an image side lens section L1*b* are disposed sequentially from the object side and constitute a first lens block BK1. Next, a second object side lens section L2*a*, a second lens base plate LS2, and a second image side lens section L2*b* are disposed sequentially from the object side and constitute a second lens block BK2. Lastly, a parallel flat plate element PT as which a seal glass of a solid state imaging element or the like is supposed is disposed. The symbol "IM" represents the imaging surface of the solid state imaging element.

Example 6

TABLE 6

Reference Wave Length = 587.56 nm
unit: mm

Construction Data

| NUM. | r | d | nd | vd | eff. diameter |
|---|---|---|---|---|---|
| OBJ | INFINITY | 400.0000 | | | |
| 1* | 0.4159 | 0.1195 | 1.56289 | 34.99 | 0.455 |
| STO | INFINITY | 0.2103 | 1.52000 | 52.99 | 0.391 |
| 3 | INFINITY | 0.0550 | 1.56289 | 34.99 | 0.380 |
| 4* | 0.7788 | 0.1448 | | | 0.411 |
| 5* | −6.2051 | 0.0526 | 1.51720 | 56.27 | 0.532 |
| 6 | INFINITY | 0.2018 | 1.52000 | 52.99 | 0.644 |
| 7 | INFINITY | 0.2000 | 1.56289 | 34.99 | 0.908 |
| 8* | −13.0253 | 0.1000 | | | 1.025 |
| 9 | INFINITY | 0.300 | 1.47400 | 56.39 | 1.202 |
| 10 | INFINITY | 0.0431 | | | 1.369 |
| IMG | INFINITY | 0.0100 | | | |

ASPHERICAL SURFACE

1: K = −1.28503e+000, A4 = 1.23205e+000, A6 = 6.83314e+001,
A8 = −1.45208e+003, A10 = 1.18411e+004
4: K = 4.08643e+000, A4 = 2.91597e+000, A6 = −1.38844e+002,
A8 = 4.76354e+003, A10 = −4.16599e+004, A12 = −6.30303e−003,
A14 = −1.08202e−001
5: K = −3.00000e+001, A4 = −3.07290e+000, A6 = −1.27286e+002,
A8 = 3.64177e+003, A10 = −3.72791e+004, A12 = −1.44164e+005,
A14 = 2.96669e+006
8: K = −2.99507e+001, A4 = −2.44118e−001, A6 = −7.94952e+000,
A8 = 2.58503e+001, A10 = −4.75500e+001

| | |
|---|---|
| FL | 1.1857 |
| Fno | 2.8600 |
| w | 60.5477 |
| Ymax | 0.7140 |
| BF | 0.3487 |
| TL | 1.3327 |

| Elem | Surfs | Focal Length | Diameter |
|---|---|---|---|
| 1 | 1-4 | 1.142285 | 0.4554 |
| 2 | 5-8 | −25.594240 | 1.0252 |

Figure 16:
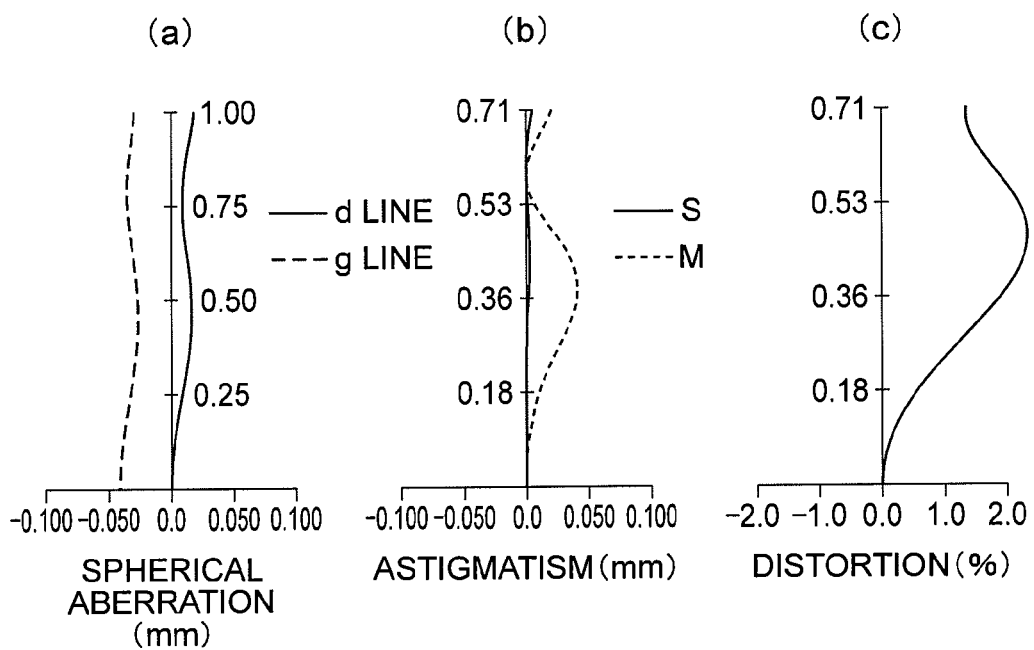
FIG. 16 is an aberration diagram of spherical aberration (a), astigmatism (b), and distortion (c) of the imaging lens pertaining to Example 6.

FIG. 16 is an aberration diagram (spherical aberration (a), astigmatism (b), and distortion (c)) of Example 6.

Example 7

Figure 17:
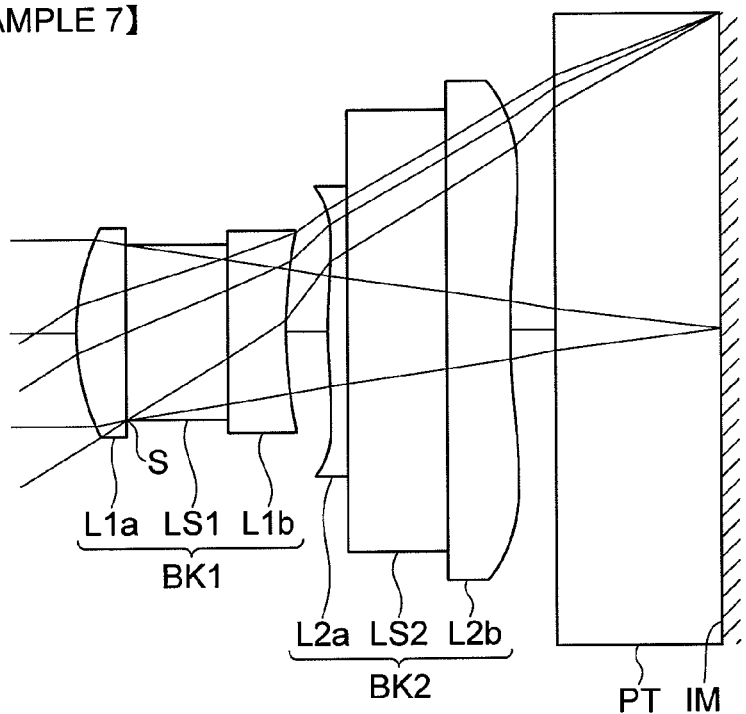
FIG. 17 is a cross sectional view of the imaging lens pertaining to Example 7.

Lens data in Example 7 are shown in Table 7. FIG. 17 is a cross sectional view of the lens of Example 6. A first object side lens section L1a, an aperture stop S, a first lens base plate LS1, and an image side lens section L1b are disposed sequentially from the object side and constitute a first lens block BK1. Next, a second object side lens section L2a, a second lens base plate LS2, and a second image side lens section L2b are disposed sequentially from the object side and constitute a second lens block BK2. Lastly, a parallel flat plate element PT as which a seal glass of a solid state imaging element or the like is supposed is disposed. The symbol "IM" represents the imaging surface of the solid state imaging element.

Example 7

TABLE 7

Reference Wave Length = 587.56 nm
unit: mm

Construction Data

| NUM. | r | d | nd | vd | eff. diameter |
|---|---|---|---|---|---|
| OBJ | INFINITY | 600.0000 | | | |
| 1* | 0.6236 | 0.1500 | 1.51784 | 56.10 | 0.590 |
| STO | INFINITY | 0.3050 | 1.51000 | 62.39 | 0.494 |
| 3 | INFINITY | 0.1810 | 1.51784 | 56.10 | 0.422 |
| 4* | 1.2308 | 0.1260 | | | 0.572 |
| 5* | 1.5401 | 0.0580 | 1.51784 | 56.10 | 0.724 |
| 6 | INFINITY | 0.3000 | 1.51000 | 62.39 | 0.818 |
| 7 | INFINITY | 0.1920 | 1.51784 | 56.10 | 1.238 |
| 8* | 1.8445 | 0.1380 | | | 1.402 |
| 9 | INFINITY | 0.5000 | 1.47140 | 66.01 | 1.630 |
| 10 | INFINITY | 0.0050 | | | 1.981 |
| IMG | INFINITY | 0.0000 | | | |

ASPHERICAL SURFACE

1: K = 1.79120e+000, A3 = −1.17350e+000, A4 = 1.81695e+001,
A5 = −1.30023e+002, A6 = 3.91848e+002, A8 = −4.20685e+003,
A10 = 8.88289e+004, A12 = −1.29992e+006,
A14 = 9.68907e+006, A16 = −2.80628e+007
4: K = −3.39260e+001, A3 = 1.52360e+000, A4 = −1.50040e+001,
A5 = 4.69460e+001, A6 = 1.05630e+001, A8 = −1.09630e+003,
A10 = 9.43880e+003, A12 = −3.81090e+004,
A14 = 5.87560e+004
5: K = −7.58610e+000, A3 = 9.73190e−001, A4 = −1.53070e+001,
A5 = 5.35330e+001, A6 = −7.00910e+001, A8 = −1.44260e+002,
A10 = 1.12470e+003, A12 = 6.39880e+003, A14 = −8.66270e+004,
A16 = 2.11840e+005
8: K = −5.00000e+0010, A4 = −9.65860e−003, A6 = −3.50620e+000,
A8 = 1.75210e+001, A10 = −6.09420e+001,
A12 = 1.22910e+002, A14 = −1.34010e+002,
A16 = 5.83690e+001

| | |
|---|---|
| FL | 1.5029 |
| Fno | 2.8680 |
| w | 50.7006 |
| Ymax | 0.8800 |
| BF | 0.4822 |
| TL | 1.7942 |

| Elem | Surfs | Focal Length | Diameter |
|---|---|---|---|
| 1 | 1-4 | 1.797171 | 0.5900 |
| 2 | 5-8 | 11.136791 | 1.4020 |

Figure 18:
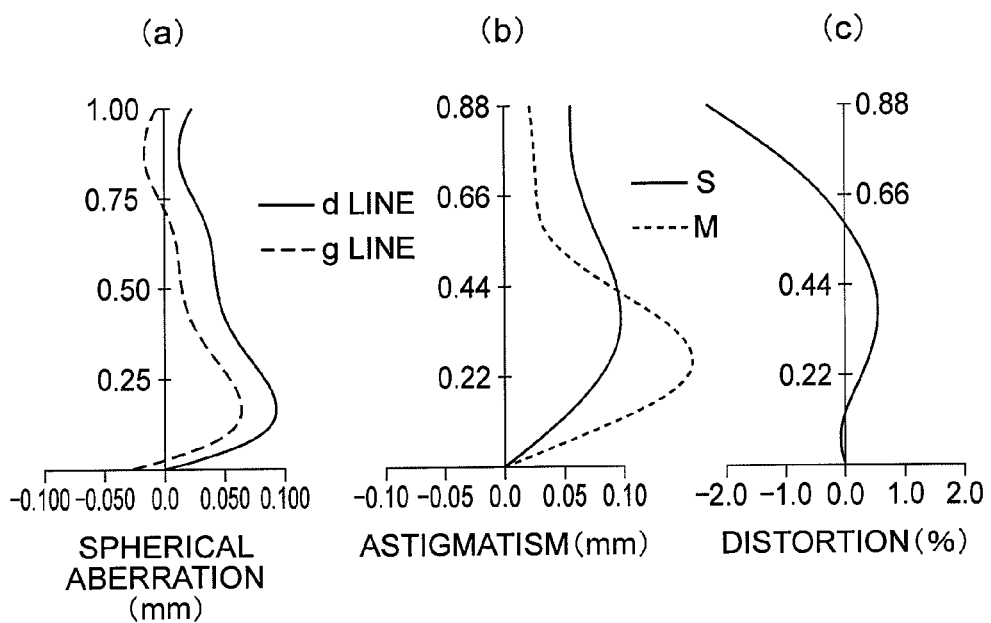
FIG. 18 is an aberration diagram of spherical aberration (a), astigmatism (b), and distortion (c) of the imaging lens pertaining to Example 7.

FIG. 18 is an aberration diagram (spherical aberration (a), astigmatism (b), and distortion (c)) of Example 7.

The values of each examples corresponding to the respective conditional expressions are shown collectively in Table 8.

| | Example 1 | Example 2 | Example 3 | Example 4 | Example 5 | Example 6 | Example 7 |
|---|---|---|---|---|---|---|---|
| (1) f1a/f | 0.748 | 0.781 | 0.685 | 0.734 | 0.808 | 0.623 | 0.801 |
| (2) f1b/f | −1.236 | −1.148 | −1.487 | −1.133 | −3.796 | −1.167 | −1.581 |

-continued

|  | Example 1 | Example 2 | Example 3 | Example 4 | Example 5 | Example 6 | Example 7 |
|---|---|---|---|---|---|---|---|
| (3) D4/f | 0.817 | 0.715 | 0.911 | 0.816 | 0.914 | 0.830 | 0.873 |
| (4) t3/f | 0.304 | 0.312 | 0.307 | 0.314 | 0.260 | 0.253 | 0.333 |
| (5) D3/f | 0.553 | 0.448 | 0.468 | 0.527 | 0.530 | 0.446 | 0.507 |
| (6) D2/f | 0.371 | 0.273 | 0.306 | 0.309 | 0.352 | 0.278 | 0.303 |
| (7) ν1b | 35.00 | 35.00 | 35.00 | 35.00 | 35.00 | 35.00 | 56.10 |
| (8) n1a | 1.566 | 1.566 | 1.563 | 1.566 | 1.563 | 1.563 | 1.518 |

The present invention should not be limited to the examples described in the description, and it is clear for one of ordinary skill in the art in the present technical field from the embodiments, examples, and technical spirits described in the present description that the present invention includes other embodiments, examples and modified examples. The enrollments and the examples in the description are merely intended to show exemplification, and the scope of the present invention will be indicated by the claims mentioned later.

REFERENCE SIGNS LIST

B Operation button
B1 First spacer member
B2 Second spacer member
BK Lens block
BK1 First lens block
BK2 Second lens block
L1a First object side lens section
L1b First image side lens section
L2a Second object side lens section
L2b Second image side lens section
LN Imaging lens
LS Lens base plate
LS1 First lens base plate
LS2 Second lens base plate
LU Imaging apparatus
MC Imaging apparatus
PT Parallel flat plate element
S Aperture stop
SR Image sensor
SS Photo-electrically converting section
T Mobile telephone
UT Lens block unit
UT1 First lens block unit
UT2 Second lens block unit

The invention claimed is:

1. An imaging lens in which an optical component including a lens base plate being a parallel flat plate and a lens section which is formed on at least one of an object side surface and an image side surface of the lens base plate and has a positive or negative power, is called a lens block;
the imaging lens consists of a first lens block and a second lens sequentially from an object side,
wherein the first lens block has a convex surface facing the object side and a concave surface facing the image side and has a positive power,
an aperture stop is disposed at the object side of the first lens block or at the inside of the first lens block,
a peripheral portion on the image side surface of the second lens has a positive power,
the object side surface of the second lens has a convex surface at the object side in the vicinity of the optical axis, and the following conditional expressions are satisfied, $$0.62 < f1a/f < 0.82 \quad (1)$$

$$-4.00 < f1b/f < -1.11 \quad (2)$$

$$0.70 < D4/f < 1.00 \quad (3)$$

where f1a represents the focal length of the object side lens section of the first lens block,
f1b represents the focal length of the image side lens section of the first lens block,
D4 represents a distance on the optical axis from the object side surface of the first lens block to the image side surface of the second lens, and
f represents the focal length of the imaging lens whole system.

2. The imaging lens described in claim 1, wherein the second lens is a lens block comprising a lens base plate being a parallel flat plate and a lens section which is formed on at least one of an object side surface and an image side surface of the lens base plate and has a positive or negative power.

3. The imaging lens described in claim 1, wherein the lens base plate is made from a resin material.

4. The imaging lens described in claim 1, further comprising a parallel flat plate element between the image side surface of the second lens and the imaging surface of an imaging element,
wherein the parallel flat plate element satisfies the following conditional expression, $$0.20 < t3/f < 0.40 \quad (4)$$

where t3 represents the thickness of the parallel flat plate element (in the case where the imaging lens includes two or more parallel flat plate elements, t3 is the sum total of respective thicknesses).

5. The imaging lens described in claim 1, wherein the first lens block and the second lens are joined to each other through a spacer member, and the spacer member is made from a resin material.

6. The imaging lens described in claim 1, wherein the following conditional expression is satisfied, $$0.43 < D3/f < 0.65 \quad (5)$$

where D3 represents a distance on the optical axis from the object side surface of the first lens block to the object side surface of the second lens.

7. The imaging lens described in claim 1, wherein the following conditional expression is satisfied, $$0.27 < D2/f < 0.50 \quad (6)$$

where D2 represents a distance on the optical axis from the object side surface of the first lens block to the image side surface of the first lens block.

8. The imaging lens described in claim 1, wherein the following conditional expression is satisfied, $$20.0 < \nu 1b < 50.0 \quad (7)$$

where ν1b represents an Abbe number of the image side lens section of the first lens block.

9. The imaging lens described in claim 1, wherein the following conditional expression is satisfied, $$1.54 < N1a < 1.65 \tag{8}$$

where N1a represents the refractive index of the object side lens section of the first lens block for d line.

10. The imaging lens described in claim 1, further comprising a lens having substantially no power.

11. An imaging apparatus comprising the imaging lens described in claim 1.

12. A mobile terminal device comprising the imaging apparatus described in claim 11.

13. An imaging lens consisting of a first lens block and a second lens sequentially from an object side,
wherein the first lens block has a convex surface facing the object side, a concave surface facing the image side and has a positive power, and a lens base plate which is a parallel flat plate between the convex surface and the concave surface,
an aperture stop is disposed at the object side of the first lens block or at the inside of the first lens block,
a peripheral portion on the image side surface of the second lens has a positive power,
the object side surface of the second lens has a convex surface at the object side in the vicinity of the optical axis, and
the following conditional expressions are satisfied, $$0.62 < f1a/f < 0.82 \tag{1}$$

$$-4.00 < f1b/f < -1.11 \tag{2}$$

$$0.70 < D4/f < 1.00 \tag{3}$$

where f1a represents the focal length of the object side lens section of the first lens block,
f1b represents the focal length of the image side lens section of the first lens block,
D4 represents a distance on the optical axis from the object side surface of the first lens block to the image side surface of the second lens, and
f represents the focal length of the imaging lens whole system.

* * * * *